United States Patent
Honma et al.

(10) Patent No.: US 8,670,165 B2
(45) Date of Patent: Mar. 11, 2014

(54) TRANSPORTED MATERIAL TRANSPORTING DEVICE AND IMAGE PROCESSING APPARATUS

(71) Applicant: Seiko Epson Corporation, Tokyo (JP)

(72) Inventors: Ryo Honma, Matsumoto (JP); Takeshi Aoki, Matsumoto (JP); Soichiro Kii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/779,161

(22) Filed: Feb. 27, 2013

(65) Prior Publication Data

US 2013/0175754 A1 Jul. 11, 2013

Related U.S. Application Data

(63) Continuation of application No. 12/907,107, filed on Oct. 19, 2010, now Pat. No. 8,508,820.

(30) Foreign Application Priority Data

Oct. 20, 2009 (JP) ................................. 2009-241760

(51) Int. Cl.
*H04N 1/04* (2006.01)
(52) U.S. Cl.
USPC ......................................... 358/498; 358/496
(58) Field of Classification Search
USPC ......... 358/496, 498, 471, 400, 401, 500, 501; 271/4.04, 10.04, 3.18, 186; 399/364, 399/374, 367; 355/23, 24
See application file for complete search history.

(56) References Cited

U.S. PATENT DOCUMENTS

| 8,508,820 B2 * | 8/2013 | Honma et al. ................ 358/498 |
| 2011/0103865 A1 | 5/2011 | Aoki et al. |
| 2011/0115146 A1 | 5/2011 | Shimomura et al. |

FOREIGN PATENT DOCUMENTS

| JP | 2004-002024 | 1/2004 |
| JP | 2007-230657 | 9/2007 |

* cited by examiner

*Primary Examiner* — Cheukfan Lee
(74) *Attorney, Agent, or Firm* — Workman Nydegger

(57) ABSTRACT

A transported material transporting device including: a power transmission switching mechanism configured to switch the transmission of the power between the nip-release switching mechanism and the drive motor between a transmitted state and a blocked state; a detection unit provided in the reversing path and configured to detect the presence or absence of the material to be transported which enters the reversing path; and a blocked-state locking mechanism configured to lock the blocked state of the power transmission switching mechanism when the discharging roller is in the released state, wherein the locked state of the blocked-state locking mechanism is released and the power transmission switching mechanism is switched from the blocked state to the transmitted state upon detection of the position of the trailing end of the material to be transported entering the reversing path by the detection unit.

7 Claims, 29 Drawing Sheets

TRANSPORTED MATERIAL TRANSPORTING DEVICE AND IMAGE PROCESSING APPARATUS

This application is a Continuation of application Ser. No. 12/907,107, filed Oct. 19, 2010, which is expressly incorporated herein by reference. The entire disclosure of Japanese Patent Application No. 2009-241760, filed Oct. 20, 2009, is expressly incorporated by reference herein.

BACKGROUND

1. Technical Field

The present invention relates to a transported material transporting device configured to reverse a material to be transported, such as a printed material transported by transporting rollers with a first surface faced in one direction, by switching the direction of rotation of the discharging rollers between a normal rotation and a reverse rotation and transport the same with a second surface of the material to be transported faced in the one direction and, more specifically, to the transported material transporting device which is configured to be able to switch the state of the discharging rollers between a nipped state and a released state at optimal timings irrespective of the length of the material to be transported, and an image processing apparatus having the transported material transporting device.

2. Related Art

As described in JP-A-2007-230657, image scanning devices such as copying machines, facsimile machines or scanners having an Auto Document Feeder as an example of a transported material transporting device are already developed. The image scanning devices as shown above include image scanning devices which are capable of scanning image data recorded on both front and rear surfaces of a material to be transported (hereinafter, referred to also as "paper") continuously. The image scanning devices described above are configured to guide a paper delivered with a first surface thereof up into a semi-loop shaped transport path, in which the transporting roller, an image scanning portion, and the discharging roller are disposed, transport the paper with the first surface down, and perform image scanning of the first surface.

Subsequently, the image scanning device switches the direction of transport to guide the paper into a reversing path and guides the same again into the transport path, thereby transporting the paper with a second surface, which is an opposite surface from the first surface, faced down, and performs image scanning of the second surface.

Switching of the direction of paper transport and switching of the state of the discharging roller between the nipped state and the released state, which are required when performing the image scanning continuously over the first surface and the second surface of the above-described paper, are performed by the transported material transporting device (hereinafter, referred to also as "paper transporting device" at preset certain timings.

The paper transport path is downsized in accordance with a tendency of downsizing of the image scanning devices, so that the length of the transport path is reduced. Therefore, when transporting a long paper, a portion of a paper delivered to the reversing path and a portion of the paper discharged out from the transport path pass each other at a nip of the discharging rollers during the transport of the second surface. Therefore, the discharging rollers are brought into the released state at the timing when the portions of the paper pass each other as described above, thereby allowing the both to pass each other.

JP-A-2007-230657 and JP-A-2004-2024 are examples of related art.

However, if the switching of the direction of transport of the paper and the switching of the state of the discharging rollers between the nipped state and the released state are performed uniformly at the preset certain timings, the length of the paper that can be provided for the double-sided scanning is limited. If a paper having a length other than those supported by the paper transporting device operated at the certain timings, transport failures such as skewing or jamming of the paper may be resulted.

It is also possible to perform the switching of the state of the discharging rollers between the nipped state and the released state separately from powers of the transporting roller and the discharging roller using a separate power, for example, a solenoid or the like which is disclosed in JP-A-2004-2024. However, it results in increase in number of components and complicated structure, thereby leading to the cost of the paper transporting device.

SUMMARY

An advantage of some aspect of the invention is that switching of the state of discharging rollers between a nipped state and a released state can be performed at preferred timings according to the lengths of materials to be transported irrespective of the difference in length of the transporting materials.

According to a first aspect of the invention, there is provided a transported material transporting device including: a transporting roller, a discharging roller, a drive motor, a nip-release switching mechanism, a planetary gear mechanism, a power transmission switching mechanism, a detection lever, and a blocked-state locking mechanism. The transporting roller is configured to transport a material to be transported on a transport path by rotating in a direction of normal rotation. The discharging roller is configured to discharge the material to be transported on the transport path by rotating in the direction of normal rotation, deliver the material to be transported to the transporting roller via a reversing path by rotating in a direction of reverse rotation, and be capable of assuming a nipped state and a released state. The drive motor serves as a driving source of the transporting roller and the discharging roller. The nip-release switching mechanism is configured to switch the state of the discharging roller between the nipped state and the released state by the rotational position of a cam drive gear. The planetary gear mechanism includes a first planetary gear configured to transmit a power to the cam drive gear when the drive motor rotates in one direction, and a second planetary gear configured to transmit the rotation in the same direction as the first planetary gear to the cam drive gear via an intermediate gear when the drive motor rotates in the other direction. The power transmission switching mechanism is configured to switch the transmission of the power between the intermediate gear and the cam drive gear between a transmitted state and a blocked state. The detection lever is provided in the reversing path and configured to detect the presence or absence of the material to be transported which enters the reversing path. The blocked-state locking mechanism is configured to lock the blocked state of the power transmission switching mechanism when the discharging roller is in the released state. The locked state of the blocked-state locking mechanism is released and the power transmission switching mechanism is switched from the blocked state to the transmitted state upon detection of the position of the trailing end of the material to be transported entering the reversing path by the detection lever.

In this configuration, the timing of translation of the discharging roller from the released state to the nipped state is set to be "upon detection of the position of the trailing end of the material to be transported" which is not affected by the difference in length of the material to be transported. Therefore, the switching of the state of the discharging roller between the nipped state and the released state can be performed at a preferred timing corresponding to the length of the material to be transported irrespective of the difference in length of the materials to be transported. Also, the timing of translation is set on the basis of the normal and reverse rotation of the single drive motor and the movement of the detection lever configured to detect the passage of the transported material. Therefore, increase in number of components is prevented. In addition, the simple structure of the apparatus is achieved. Therefore, reduction of the product cost is also achieved.

Preferably, the cam drive gear includes on a peripheral surface thereof an entirely toothed portion formed with teeth over the entire circumference and a partially toothed portion provided partially with a tooth missing portion for home position and a tooth missing portion for release position, both of which are parts having no tooth provided partly on the peripheral surface. The first planetary gear engages the entirely toothed portion and the intermediate gear engages the partially toothed portion, and the intermediate gear is configured to be capable of being moved by the power transmission switching mechanism between a first position formed with both the tooth missing portion for home position and the tooth missing portion for release position and a second position formed only with the tooth missing portion for home position in an axial direction.

In this configuration, the first planetary gear engages the cam drive gear when the drive motor rotates in the reverse direction, for example. Therefore, the rotation of the first planetary gear is always transmitted to the cam drive gear through the entirely toothed portion of the cam drive gear. In contrast, the second planetary gear engages the cam drive gear via the intermediate gear when the drive motor rotates in the normal direction. Therefore, the rotation in the same direction as when the drive motor rotates in the reverse direction is transmitted to the cam drive gear at a portion of the cam drive gear where the teeth in the partially toothed portion is formed.

When the intermediate gear is located at the first position, a blocked state is assumed. The blocked state is the state where the intermediate gear and the cam drive gear do not engage at two positions where the tooth missing portion for home position and the tooth missing portion for release position are formed and no transmission of the power occurs. When the intermediate gear is located at the second position, the blocked state is assumed at a portion where the tooth missing portion for home position is formed.

Therefore, the rotation and the stop of the cam drive gear can be controlled by the two tooth missing portions formed on the peripheral surface of the cam drive gear and the axial movement of the intermediate gear, so that the switching of the above-described discharging rollers between the nipped state and the released state can be performed at an optimal timing corresponding to the length of the material to be transported without providing an additional drive unit.

Preferably, the power transmission switching mechanism includes: a cam lever, a frictional clutch, and a cam lever drive gear train. The cam lever is provided with a solid cam coming into abutment with an end surface of the intermediate gear and having a cam height in the axial direction, and is configured to rock about a rocker shaft within a range of the rocking angle. The frictional clutch is configured to come into press contact with the cam lever and transmit a power. The cam lever drive gear train is configured to transmit the rotation of the drive motor to the frictional clutch.

In this configuration, the power transmission switching mechanism which is operated using the rotation of the single drive motor can be configured, so that the intermediate gear can be moved in the axial direction by a predetermined stroke by adjusting the cam height of the solid cam which acts on an end surface of the intermediate gear by switching the rocking position of the cam lever. Since the friction clutch is employed as a member for transmitting the power by acting directly on the cam lever, the power transmission to the cam lever is ensured, and the quick switching of the rocking position of the cam lever is achieved.

Preferably, the cam lever includes a sector gear portion configured to transmit the power by engaging the intermediate gear when moving the intermediate gear from the first position to the second position.

In this configuration, execution of the movement of the intermediate gear toward the first position and the second position is ensured by the engagement between the sector gear portion and the cam lever drive gear train without causing a slippage, so that the reliability of the power transmission switching operation is enhanced.

Preferably, the blocked-state locking mechanism includes a restricting member provided at a working end of the detection lever and an engaging projection provided on part of a peripheral surface of the cam lever and coming into abutment with the restricting member, the restricting member comes into abutment with the engaging projection to restrict the rocking movement of the cam lever after the material to be transported enters the reversing path and the detection lever detects the passage of a leading end of the material to be transported until the passage of a trailing end of the material to be transported is detected in a state in which the cam lever locates the intermediate gear at the first position.

In this configuration, the blocked-state locking mechanism is achieved with a simple structure in which only the restricting member and the engaging projection are provided, and smooth switching of the power transmission switching mechanism between the transmitted state and the blocked state is achieved by associating the movement of the detection lever which detects the position of the transported material entering the reversing path and the timing of the blocked-state locking mechanism between the locked state and the unlocked state without providing an additional position sensor or a drive unit.

A second aspect of the invention is an image processing apparatus including: an image processing executing unit; and a transported material transporting device. The image processing executing unit is provided in a transport path at a position between a transporting roller and a discharging roller and configured to execute image processing actions continuously on an opposed surface of a material to be transported which is transported by the transporting roller. The transported material transporting device is configured to switch the direction of transport of the material to be transported to cause the material to be transported to enter a reversing path and reverse the same so that a first surface and a second surface opposite therefrom are opposed to the image processing executing unit after having executed the image processing on a first surface of the material to be transported. The transported material transporting device is a transported material transporting device according to the first aspect of the invention.

In this configuration, the first surface transport and the second surface transport which is achieved smoothly without being affected by the length of the material to be transported owing to the same effects and advantages as those described above. Therefore, the image processing to be performed on both surfaces of the material to be transported is achieved with a high degree of accuracy without being affected by the length of the material to be transported.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
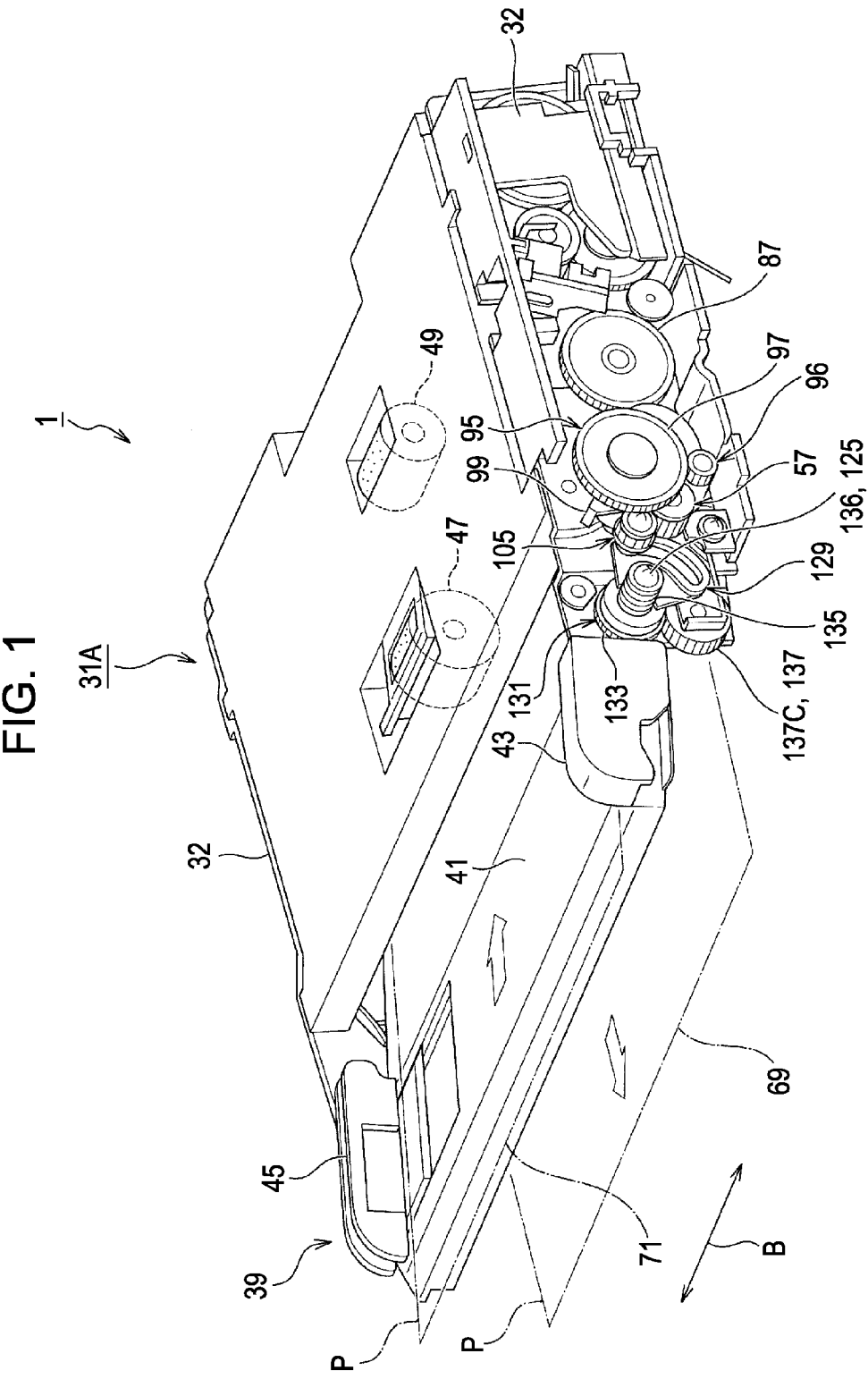
FIG. 1 is a perspective view showing an appearance of a paper transporting device according to a first embodiment of the invention.

Referring now to the drawings, a transported material transporting device and an image processing apparatus according to the invention will be described in detail on the basis of first and second embodiments shown below. First of all, a scanner 1 is exemplified as an embodiment for carrying out the image processing apparatus having the transported material transporting device of the invention mounted thereon, and an outline of an internal structure of the scanner 1 will be described.

The scanner 1 in the drawing is an image scanning device which is capable of continuously scanning images printed on both a first surface 3 of a material to be transported which corresponds to an original document (hereinafter, referred to also as "paper") P and a second surface 5 which is a surface opposite from the first surface 3.

More specifically, as shown in FIG. 1 to FIG. 7, the scanner 1 is made up of a transported material transporting device 31 configured to perform a first surface transport which guides the paper P supplied with the first surface 3 faced up to a semi-loop shaped transport path 19 having transporting rollers 7 and discharging rollers 13 disposed therein to cause the first surface 3 to face down, then perform a second surface transport which causes the paper P to enter a reversing path 27 by switching the direction of transport and guides the same again to the transport path 19 to cause the second surface 5 down, and an image processing executing unit 35 provided at an intermediate position between the transporting rollers 7 and the discharging rollers 13 of the transport path 19 and configured to continuously perform an image processing action with respect to the first surface 3 and the second surface 5 of the paper P transported by the transporting rollers 7.

The transport path 19 is made up of a path member in which a first transporting unit 21, a turning portion 23 and a second transporting unit 25 are disposed in a semi-loop shape. Then, disposed at positions upstream of the first transporting unit 21 is a feeding tray 39 having a placing table 41 for placing the paper P, and a fixed edge guide 43 and a movable edge guide 45 that adjust and set the positions of left and right edges of the paper P which is set on the placing table 41.

Disposed in a section from above a distal end portion of the feeding tray 39 to a transporting portion of the first transporting unit 21 in the transport path 19 are a pick roller 47 configured to feed a topmost paper P from a plurality of pieces of the paper P set in piles on the feeding tray 39 in sequence from the top, and a separating roller 49 and a separating pad 51 configured to separate only the topmost paper P from the plurality of pieces of the paper P delivered together and feed the same toward the transport path 19.

The first transporting unit 21 is a portion which receives the paper P delivered from the feeding tray 39 described above first, and the paper P in the first transporting unit 21 is transported with the first surface 3 faced up.

The turning portion 23 is a portion to reverse the paper P fed from the first transporting unit 21 upside down and delivers the same to the second transporting unit 25. The above-described transporting rollers 7 including a pair of nip rollers, namely, a transporting drive roller 9 and a transporting driven roller 11 are disposed at a position downstream of the turning portion 23.

The second transporting unit 25 serves to receive the paper P reversed upside down by the above-described turning portion 23, and transport the same toward the image processing executing unit 35, and further toward the above-described discharging rollers 13 including the pair of nip rollers, namely a discharge drive roller 15 and a discharge driven roller 17 which are present at a downstream end of the second transporting unit 25. The paper P is delivered in the second transporting unit 25 with the first surface 3 faced down during the first surface transport, and with the second surface 5 faced down during the second surface transport.

The discharging rollers 13 are configured to be switched in state by a nip-release switching mechanism 55, described later, between a nipped state and a released state, and allows a leading end 69 and a trailing end 71 of the paper P to pass each other at a nip of the discharging roller 13, which is encountered when transporting an long paper P.

Figure 3:
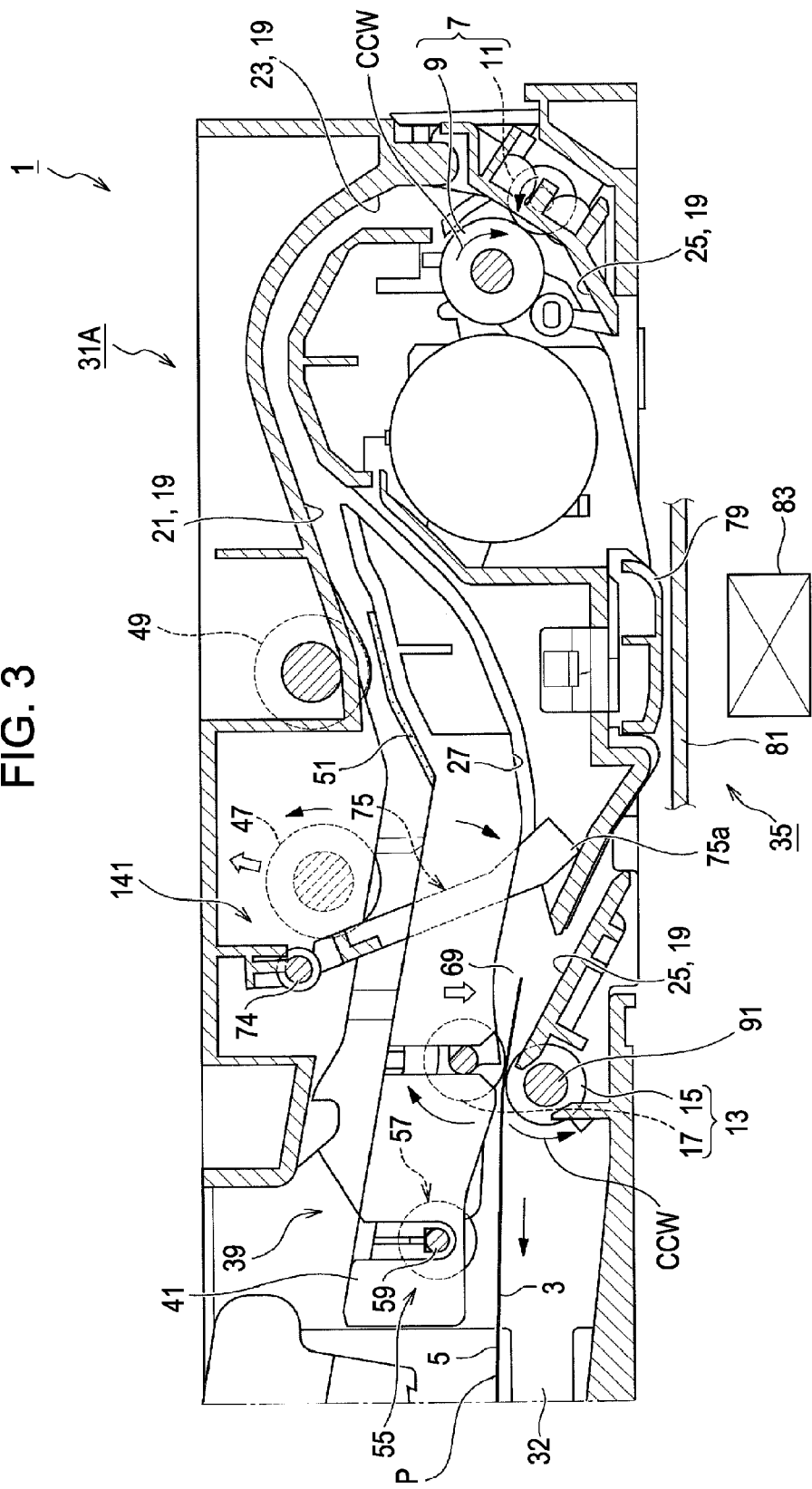
FIG. 3 is a side cross-sectional view showing an internal structure of the paper transporting device according to the first embodiment of the invention when the first surface transport is ended.

The reversing path 27 is a path configured to guide the paper P after having ended the first surface transport again to an upstream portion of the turning portion 23 of the transport path 19 and reverse the paper P upside down for the second surface transport as shown in FIG. 3. A distal end portion 75a of a detection lever 75 configured to detect the presence or absence of the paper P faces the reversing path 27.

The image processing executing unit 35 basically includes a transported material supporting portion disposed above the paper P to be transported and configured to hold the paper P from above and support the same in an expanded state (hereinafter, referred to as "a paper supporting portion") 79, a glass plate 81 disposed below the transported paper P, and an image scanning portion 83 provided in a housing partitioned by the glass plate 81 and including a fluorescent lamp and a light-receiving sensor.

First Embodiment

See FIG. 1 to FIG. 18

A paper transporting device 31A according to a first embodiment described later can be mounted in the scanner 1. The paper transporting device 31A includes a drive motor, not shown, which can be rotated in normal and reverse directions, a roller driving gear train for transport, not shown, configured to transmit the rotation of the drive motor to the transporting rollers 7 to rotate the same in a normal direction CCW in a normal state, a discharge roller drive gear train 87 configured to transmit the rotation of the drive motor to the discharging rollers 13 to rotate the same both in the normal direction CCW and in a reverse direction CW, and the nip-release switching mechanism 55 configured to switch the state of the discharging rollers 13 between the nipped state and the released state according to the rotational position of a cam drive gear 57.

Furthermore, the paper transporting device 31A includes a planetary gear mechanism 95 having a first planetary gear 101 configured to transmit a power to the cam drive gear 57 when the drive motor rotates in the reverse direction and a second planetary gear 103 configured to transmit a power to the cam drive gear 57 via an intermediate gear 105 when the drive motor rotates in the normal direction, a power transmission switching mechanism 121 configured to switch power transmission between the intermediate gear 105 and the cam drive gear 57 between a transmitted state and a blocked state, the detection lever 75 provided in the reversing path 27 and configured to detect the presence or absence of the paper P entering the reversing path 27, and a blocked-state locking mechanism 141 configured to lock the blocked state of the power transmission switching mechanism 121 when the discharging rollers 13 are in the released state.

The paper transporting device 31A is configured to release the locked state of the blocked-state locking mechanism 141 and switch the blocked state of the power transmission switching mechanism 121 to the transmitted state upon detection of the position of the trailing end 71 of the paper P entering the reversing path 27 by the detection lever 75.

Only one drive motor is provided, and the drive motor is configured to be capable of transmitting the power thereof to the transporting drive roller 9, the discharge drive roller 15, and the cam drive gear 57, and causing the nip-release switching mechanism 55, the planetary gear mechanism 95, and the power transmission switching mechanism 121 to perform desired actions by switching the direction of rotation thereof between the normal direction CCW and the reverse direction CW at predetermined timings.

The roller driving gear train for transport is a gear train configured to transmit the rotation of the drive motor to the transporting drive roller 9. The roller driving gear train for transport is integrated with a mechanism which rotates the transporting drive roller 9 in the normal direction CCW in the normal state even when the drive motor switches the direction of rotation either to the normal direction CCW or to the reverse direction CW. Specifically, the planetary gear mechanism 95 described later and a mechanism which is basically the same as a configuration to rotate the cam drive gear 57 in the fixed direction by combining the intermediate gear 105 are integrated therein, for example.

The discharge roller drive gear train 87 is a gear train configured to transmit the rotation of the drive motor in the normal direction CCW and the reverse direction CW to the discharge drive roller 15. Specifically, a first transmission gear 88 having a large-diameter gear portion 88a and a small-diameter gear portion 88b integrally therewith is provided at a trailing end of the discharge roller drive gear train 87. Then, a discharge roller drive gear 89 mounted at one end of a discharge roller drive shaft 91 engages the small-diameter gear portion 88b of the first transmission gear 88, so that the rotation of the discharge roller drive gear 89 is transmitted to the discharge drive roller 15 via the discharge roller drive shaft 91 without change.

Figure 2:
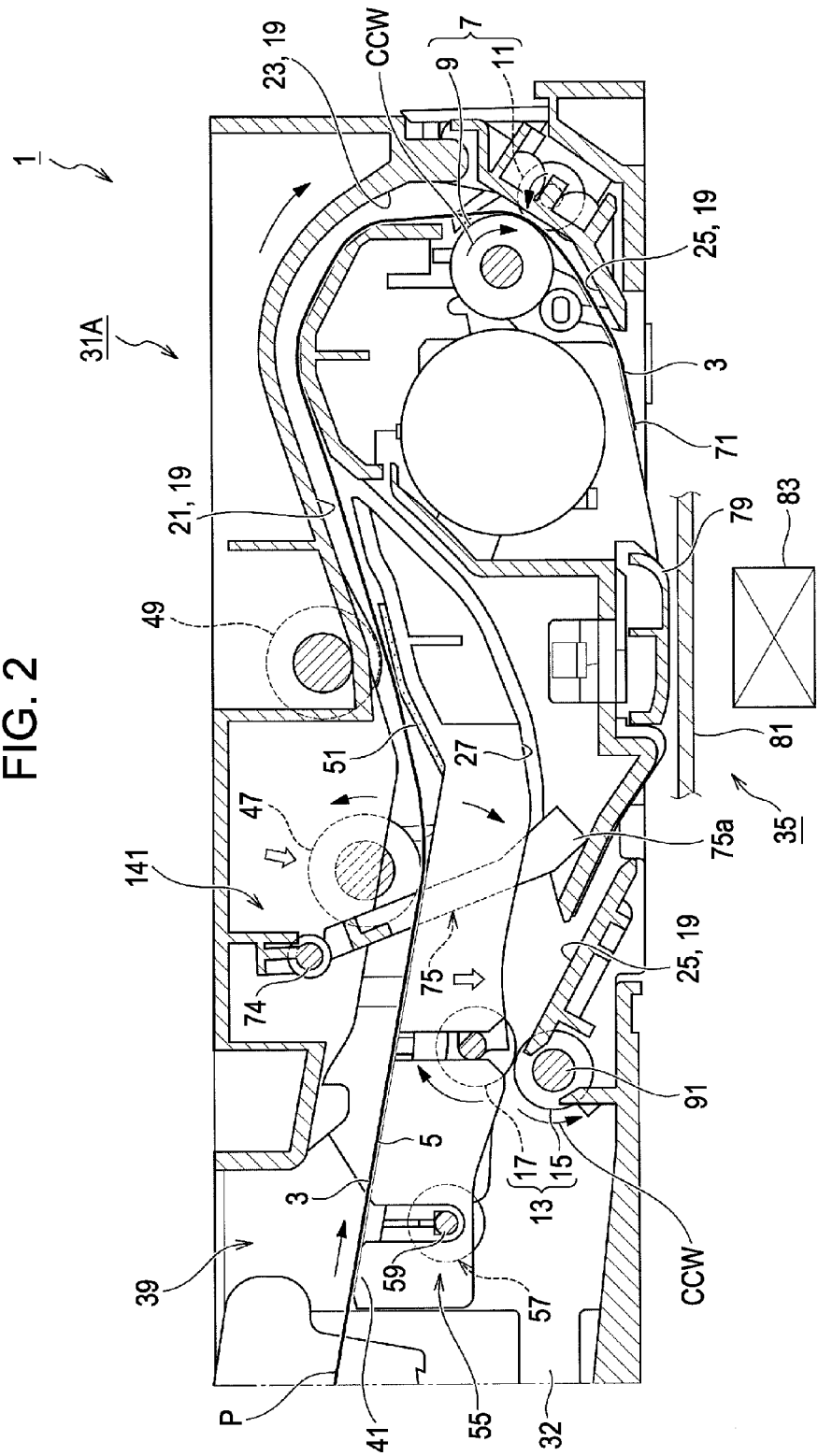
FIG. 2 is a side cross-sectional view showing an internal structure of the paper transporting device according to the first embodiment of the invention during a first surface transport.
Figure 4:
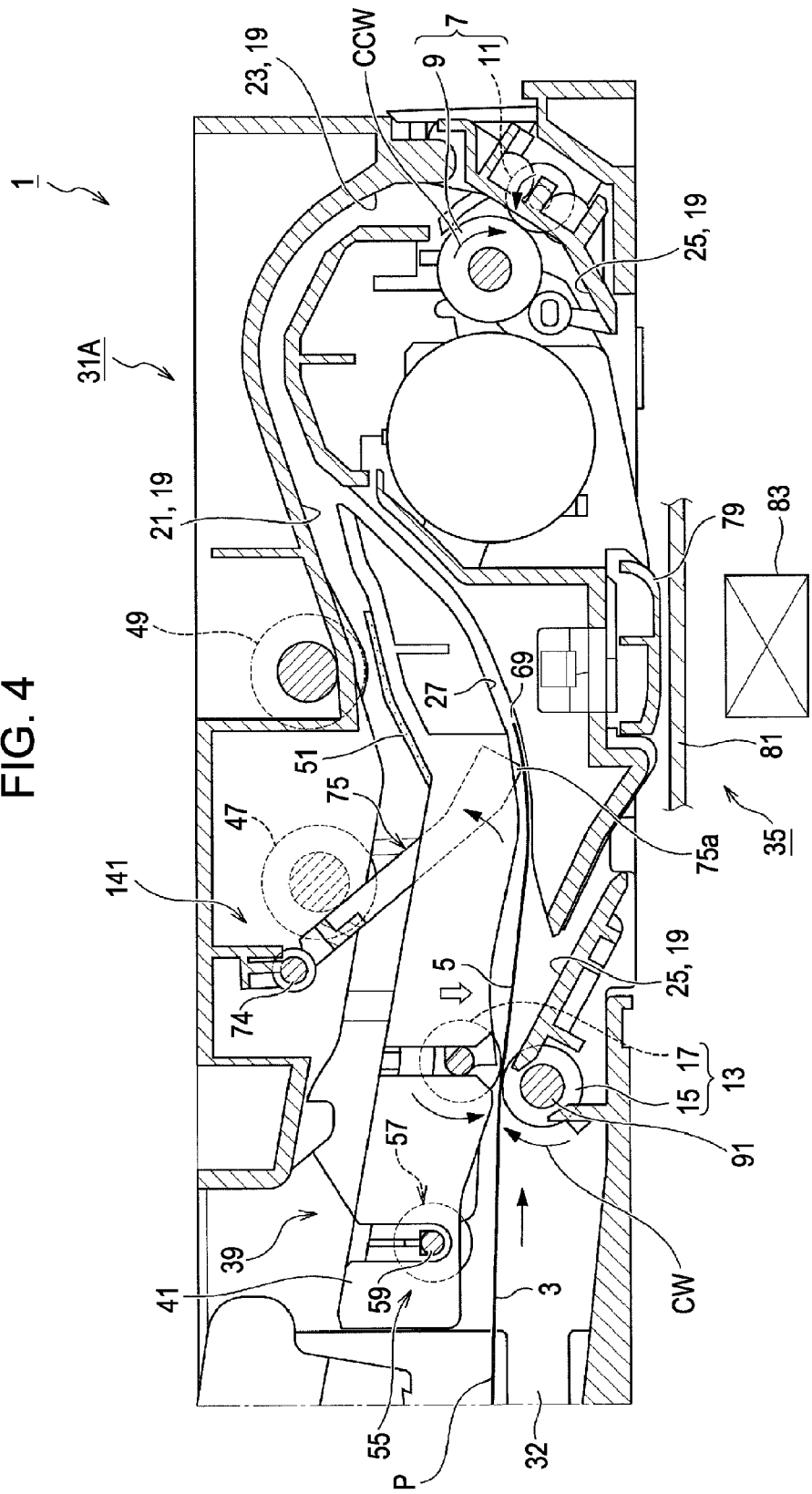
FIG. 4 is a side cross-sectional view showing an internal structure of the paper transporting device according to the first embodiment of the invention when a second surface transport is started.
Figure 7:
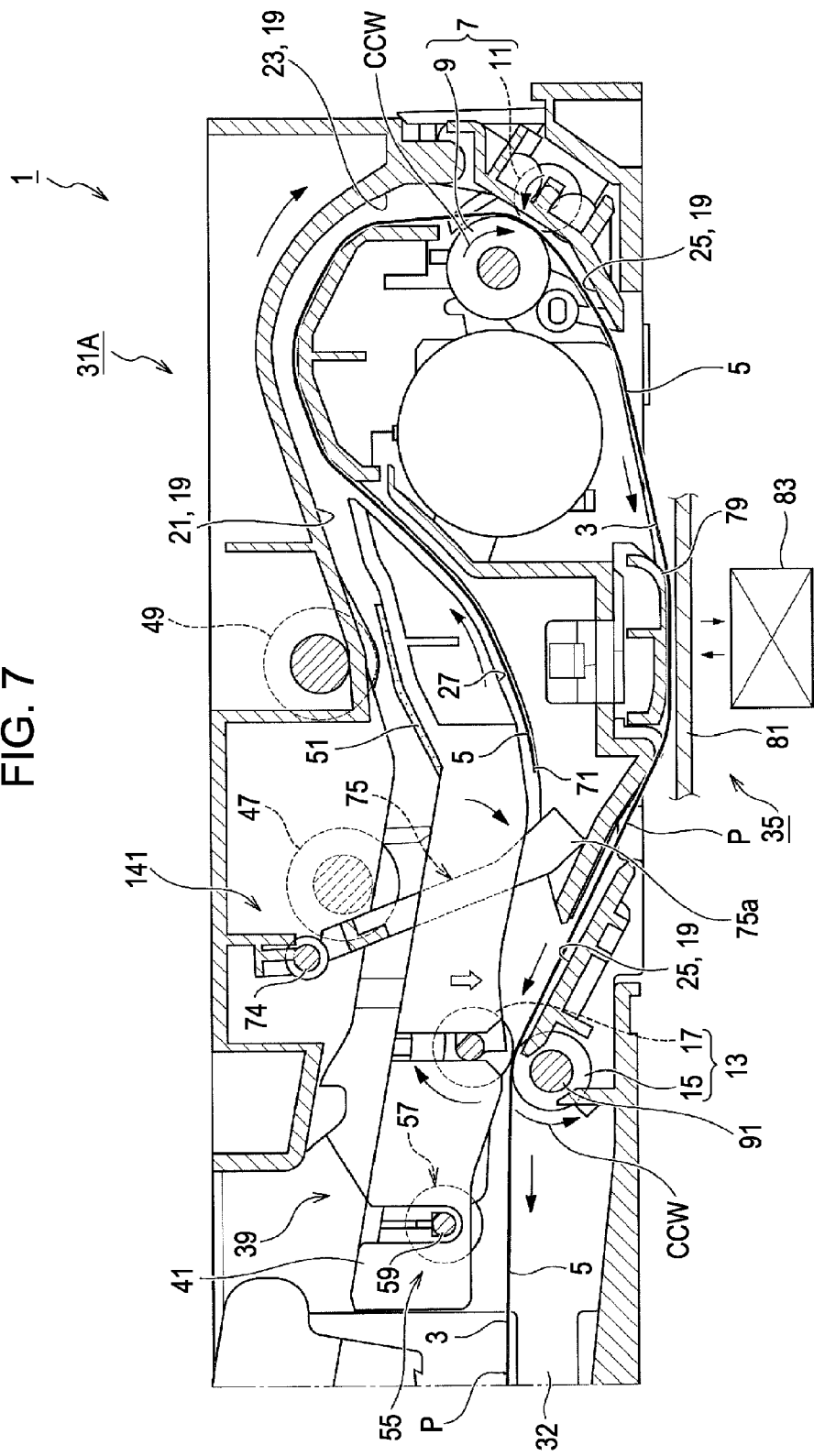
FIG. 7 is a side cross-sectional view showing an internal structure of the paper transporting device according to the first embodiment of the invention during a latter half of the second surface transport.

For example, when discharging the paper P fed to the second transporting unit 25 to the outside, the discharge drive roller 15 is rotated in the normal direction CCW as shown in FIG. 2 and FIG. 7. When causing the paper P after having ended the first surface transport and moved to a position shown in FIG. 3 to enter the reversing path 27 as shown in FIG. 4, the discharge drive roller 15 is rotated in the reverse direction CW as shown in the same drawing.

The nip-release switching mechanism 55 integrally includes the cam drive gear 57 configured to receive the transmission of the power via the planetary gear mechanism 95, described later, and the intermediate gear 105, a cam shaft 59 having the cam drive gear 57 mounted at one end thereof and extending horizontally toward a center portion of the transport path 19 in a width direction B, two cams 61 and 61 provided at the other end of the cam shaft 59, two cam followers 63 and 63 coming into abutment individually with the two cams 61 and 61, and the cam followers 63 and 63. The nip-release switching mechanism 55 also includes a roller holder 18 for the discharge driven roller 17 configured to rock about a rocker shaft, not shown, within a certain angular range, and an urging member 65 formed of a compression coil spring which presses an upper surface of the roller holder 18 on the side of a free end of the rocking motion and urging the discharge driven roller 17 toward the discharge drive roller 15. This is the basic configuration of the nip-release switching mechanism 55.

Figure 14:
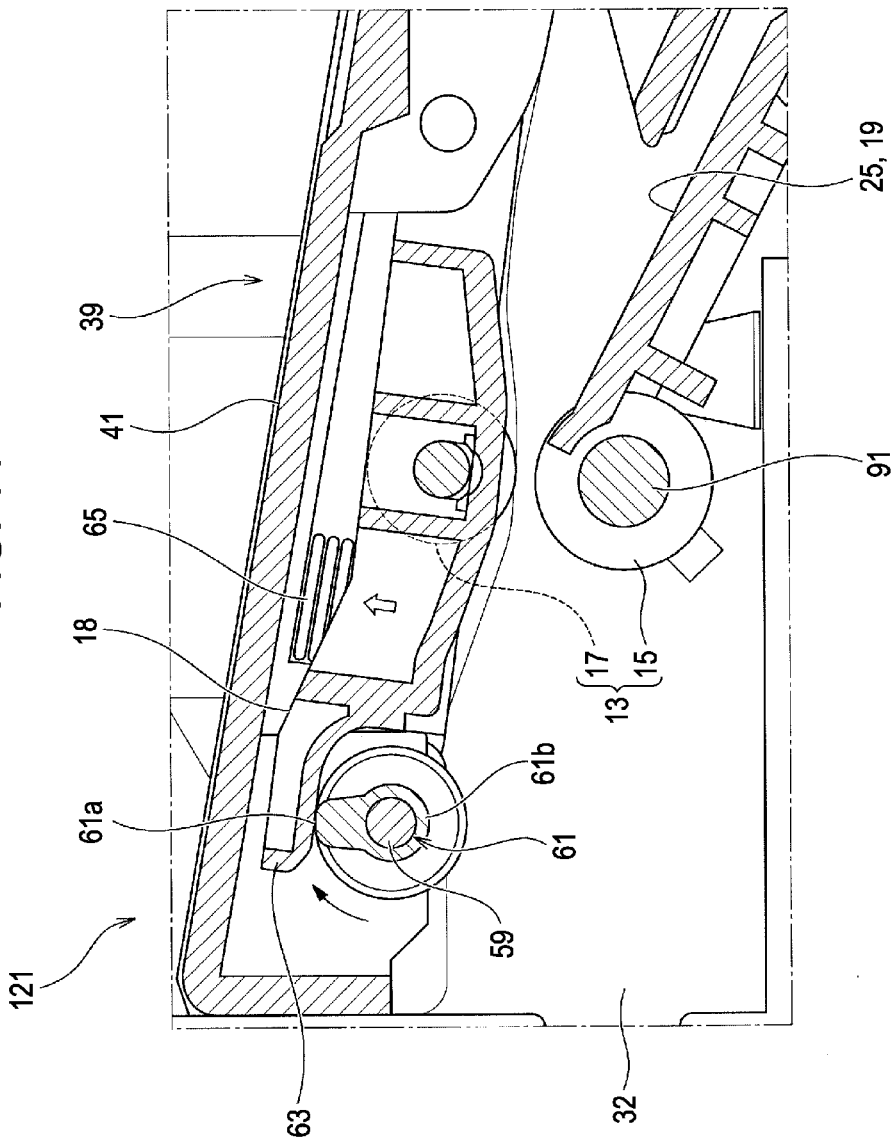
FIG. 14 is a side cross-sectional view of the nip-release switching mechanism and the periphery of discharging rollers of the paper transporting device according to the first embodiment of the invention showing a state in which the discharging rollers are in a released state in an enlarged scale.

The discharging rollers 13 are held in the released state at a position shown in FIG. 14, at which a distal end portion 61a, which is the highest portion of the cam 61, is in abutment with the cam follower 63. The discharging rollers 13 are brought into the nipped state at a position shown in FIG. 17, at which a proximal end portion 61b, which is the lowest portion of the cam 61 is in abutment with the cam follower 63.

The cam drive gear 57 is configured to rotate always in the fixed direction irrespective of the direction of rotation of the drive motor switched by the action of the planetary gear mechanism 95 and the intermediate gear 105, described below.

The cam drive gear 57 includes on a peripheral surface thereof an entirely toothed portion 107 formed with teeth over the entire circumference on the distal end side thereof and a partially toothed portion 109 provided partially with a tooth missing portion 111 for home position and a tooth missing portion 113 for release position having no tooth on the proximal side thereof.

The tooth missing portion 111 for home position is a tooth missing portion which prevents the power from being transmitted to the cam drive gear 57 when the cam drive gear 57 is at the home position, and is formed over the entire length of the partially toothed portion 109. In contrast, the tooth missing portion 113 for release position is a tooth missing portion which prevents the power from being transmitted to the cam drive gear 57 when the cam drive gear 57 is at the released position, and is formed partially on the partially toothed portion 109 in a range nearer the entirely toothed portion 107.

The planetary gear mechanism 95 basically includes a second transmission gear 96 integrally having a large-diameter gear portion 96a and a small-diameter gear portion 96b which rotate in engagement with the discharge roller drive gear 89, a solar gear 97 integrally having a large-diameter gear portion 97a and a small-diameter gear portion 97b which engages the small-diameter gear portion 96b, a rocker arm 99 which rocks and rotates about a rotating shaft 98 of the solar gear 97, the first planetary gear 101 axially supported at one end of the rocker arm 99 and the second planetary gear 103 axially supported at the other end of the rocker arm 99.

The first planetary gear 101 and the second planetary gear 103 are configured to engage the small-diameter gear portion 97b with the intermediary of the small-diameter gear portion 97b of the above-described solar gear 97 interposed at the center therebetween.

The first planetary gear 101 has a role to rock the rocker arm 99 in a direction to cause the first planetary gear 101 to engage the cam drive gear 57 when the drive motor rotates in the reverse direction CW and transmit the power to the cam drive gear 57 to rotate the same in the predetermined direction.

In contrast, the second planetary gear 103 has a role to rock the rocker arm 99 in the direction opposite from the above-described direction when the drive motor rotates in the normal direction CCW and transmit the power to the cam drive gear 57 via the intermediate gear 105 to rotate same in the same direction as described above.

At this time, the first planetary gear 101 engages the entirely toothed portion 107 of the cam drive gear 57, and the intermediate gear 105 engages the partially toothed portion 109 of the cam drive gear 57.

The intermediate gear 105 is configured to be capable of being moved by the power transmission switching mechanism 121, described below, between a first position 115 formed with both the tooth missing portion 111 for home position and the tooth missing portion 113 for release position and a second position 117 formed only with the tooth missing portion 111 for home position in an axial direction G.

The power transmission switching mechanism 121 basically includes a cam lever 129, a friction clutch 131, and a cam lever drive gear train 137 (137A, 137B, and 137C). The cam lever 129 includes a solid cam 123 coming into abutment with an end surface 105a on the proximal side of the intermediate gear 105 and having a cam height in the axial direction G, and a long hole 127 for rocking movement formed along a circular trace having a predetermined radius about a rocker shaft 125 and being curved into an arcuate shape fitted on a shaft portion 105b of the intermediate gear 105. The cam lever 129 has a sectoral plate-shaped free end of the rocking motion, and is rocked within the range of a predetermined rocking angle which is set by the long hole 127 for rocking movement. The friction clutch 131 includes a friction gear 133 configured to come into press contact with the cam lever 129 to transmit the power and an urging member 135 formed of a compression spring, and configured to provide an urging force to bring the friction gear 133 into press contact with the cam lever 129. The cam lever drive gear train 137 (137A, 137B, and 137C) transmits the rotation of the drive motor to the friction gear 133.

The solid cam 123 is provided in the periphery of the long hole 127 for rocking movement, and has a cam surface 123a inclined smoothly so that the cam height becomes the lowest at one end 127a of the long hole 127 for rocking movement and the cam height becomes the highest at the other end 127b.

The cam lever 129 includes a friction disk 129a at the proximal side of the rocking movement. The friction disk 129a is brought into directly press contact with the friction gear 133 described above, and rocks about the rocker shaft 125. Provided on a part of the peripheral surface of the friction disk 129a is a sector gear portion 138, which engages a third gear 137C arranged at a trailing end of the cam lever drive gear train 137 together with the friction gear 133.

The sector gear portion 138 has a role to transmit the power to the third gear 137C by engaging the same when moving the intermediate gear 105 to the second position 117. On other portions of the friction disk 129a which is not provided with the sector gear portion 138, the rotation of the third gear 137C is transmitted to the friction gear 133, and then to the cam lever 129 via a frictional force from the friction gear 133.

The friction clutch 131 includes the friction gear 133 and the urging member 135 arranged so as to interpose the friction disk 129a of the cam lever 129 therebetween as described above, and is formed by placing a flat washer 139, which also serves as a spring seat, on an end surface of the compression coil spring, which is the urging member 135, and tightening a tightening screw 136 with a predetermined tightening force.

The cam lever drive gear train 137 includes three gears, namely, the first gear 137A, the second gear 137B, and the third gear 137C, and is configured as follows. The power is transmitted in sequence from the first gear 137A which engages the large-diameter gear portion 96a of the second transmission gear 96 described above to the second gear 137B, and then to the third gear 137C, so that the rotation of the third gear 137C is transmitted to the above-described cam lever 129 via the friction gear 133 or the sector gear portion 138 as described above.

Figure 8:
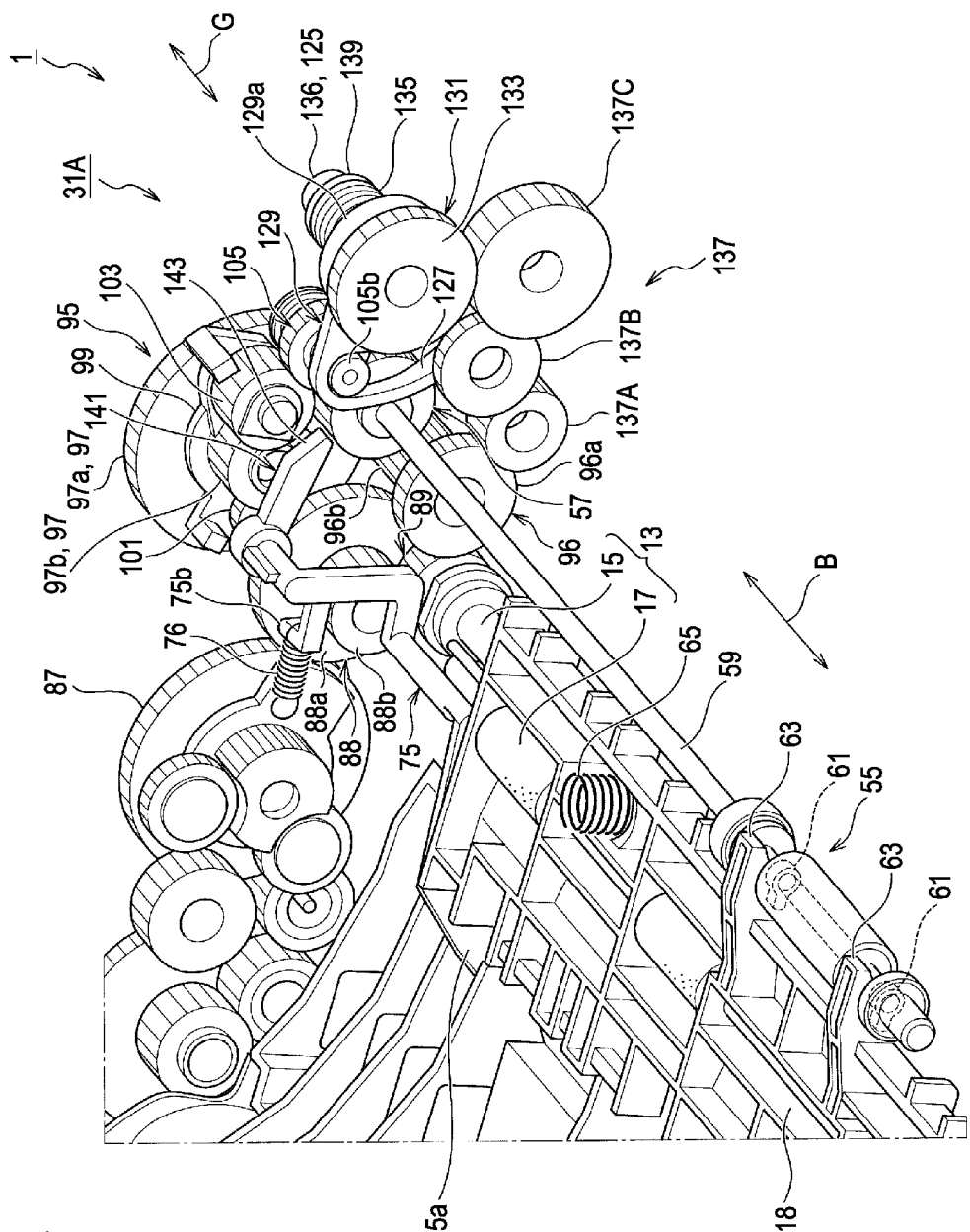
FIG. 8 is a perspective view of the paper transporting device according to the first embodiment of the invention showing a nip-release switching mechanism and a gear train which is responsible for actions of respective portions.
Figure 9:
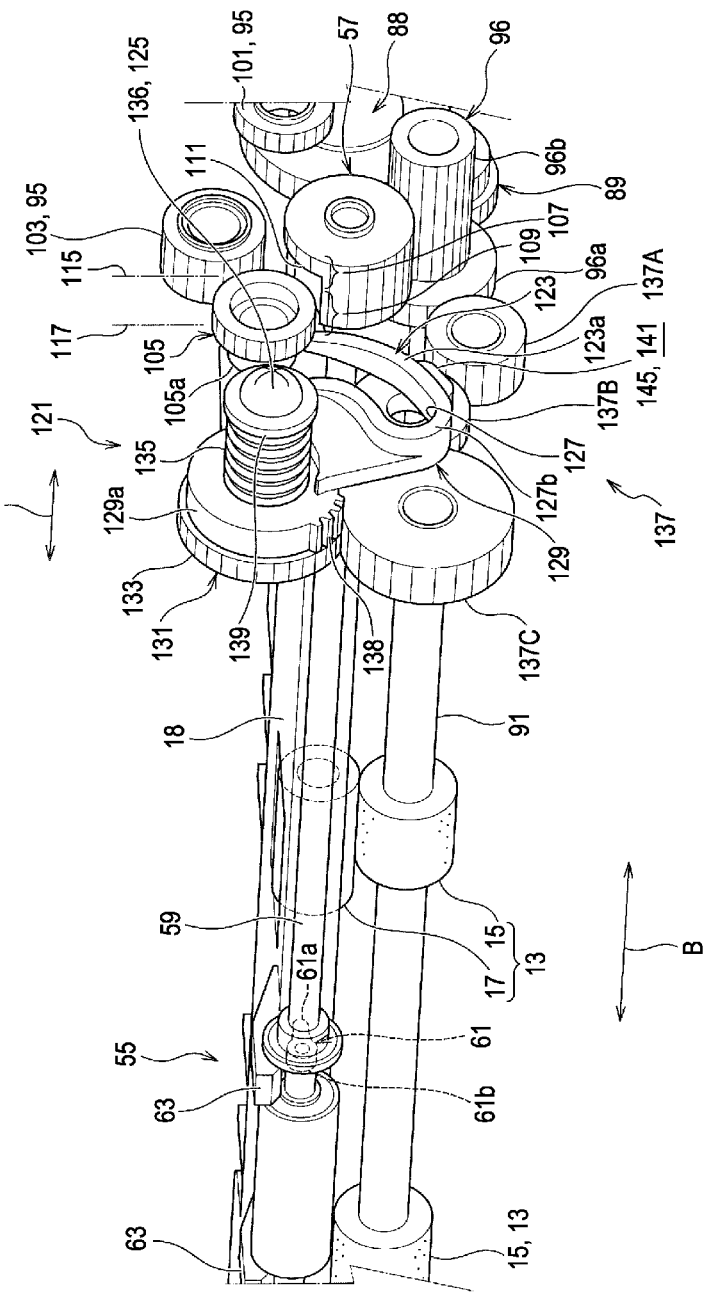
FIG. 9 is a perspective view of the paper transporting device according to the first embodiment of the invention showing the nip-release switching mechanism and a gear train provided in the periphery of a cam drive gear in a state in which discharging rollers is in a nipped state.
Figure 12:
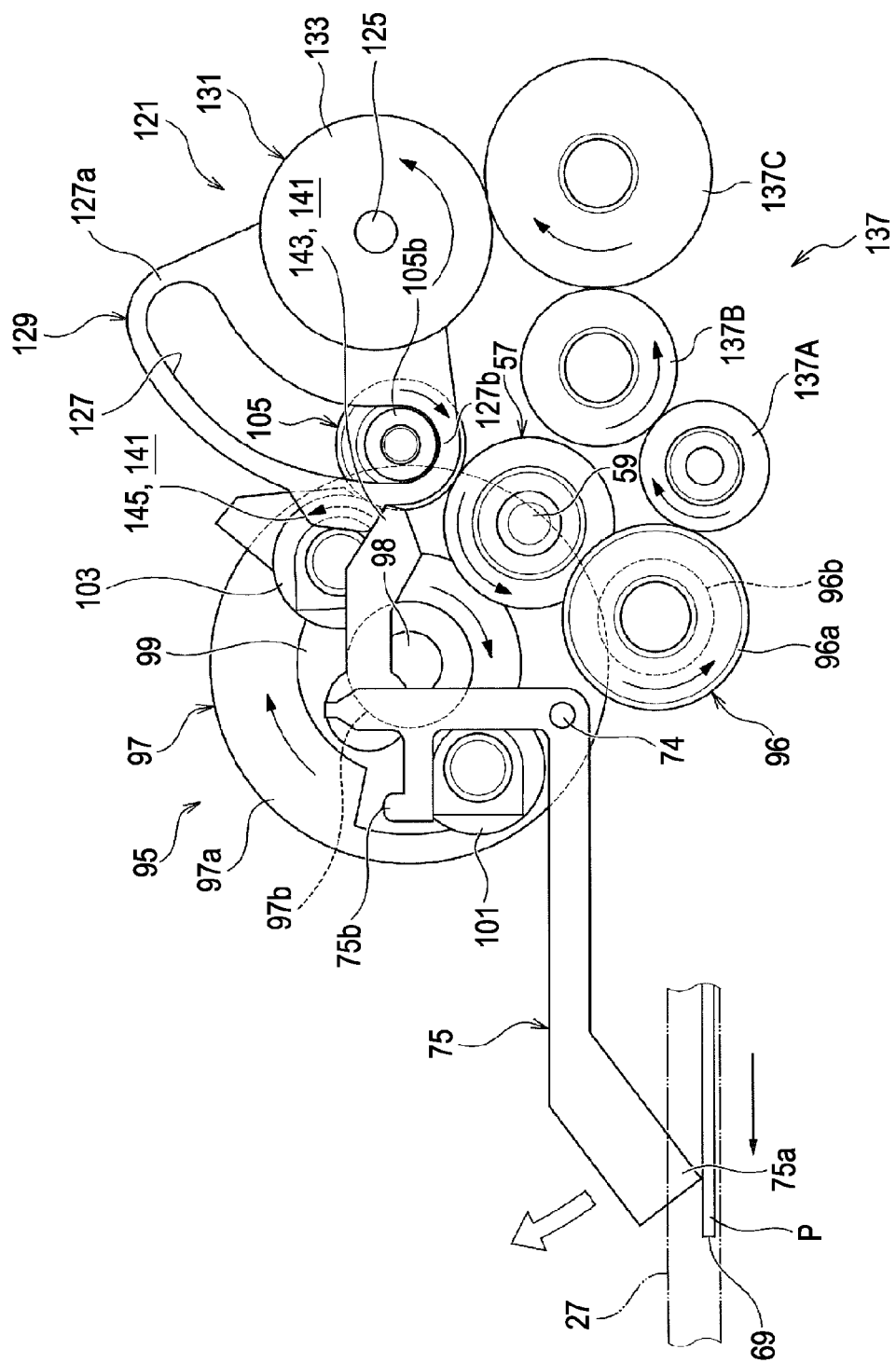
FIG. 12 is a side view of an operating state of the paper transporting device according to the first embodiment of the invention showing a state in which a cam lever, a detection lever, and the cam drive gear is locked in a power blocked state.
Figure 13:
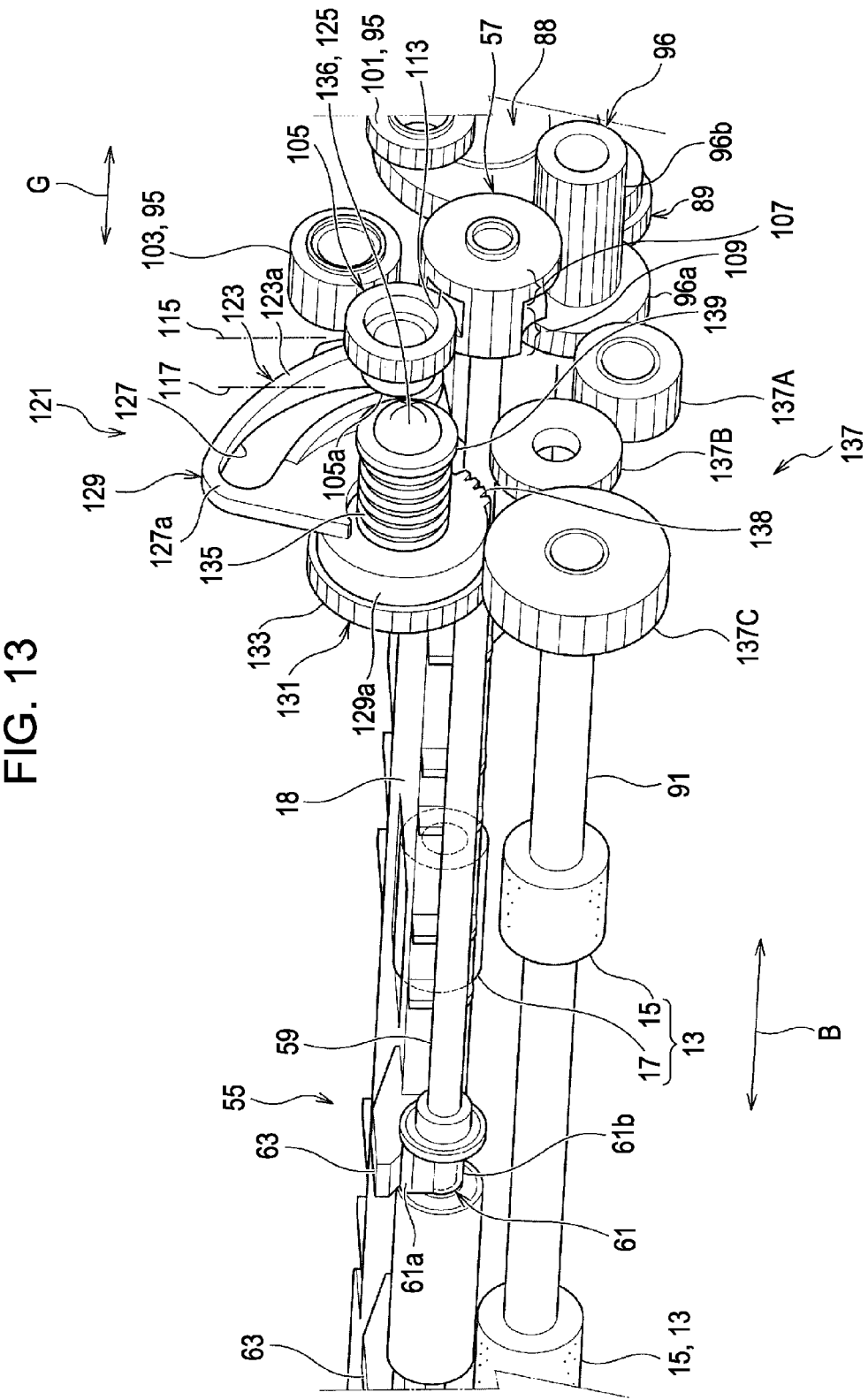
FIG. 13 is a perspective view of the nip-release switching mechanism and the gear train provided in the periphery of the cam drive gear of the paper transporting device according to the first embodiment of the invention showing a state in which the discharging roller is in a released state and the cam drive gear is locked in the power blocked state.
Figure 15:
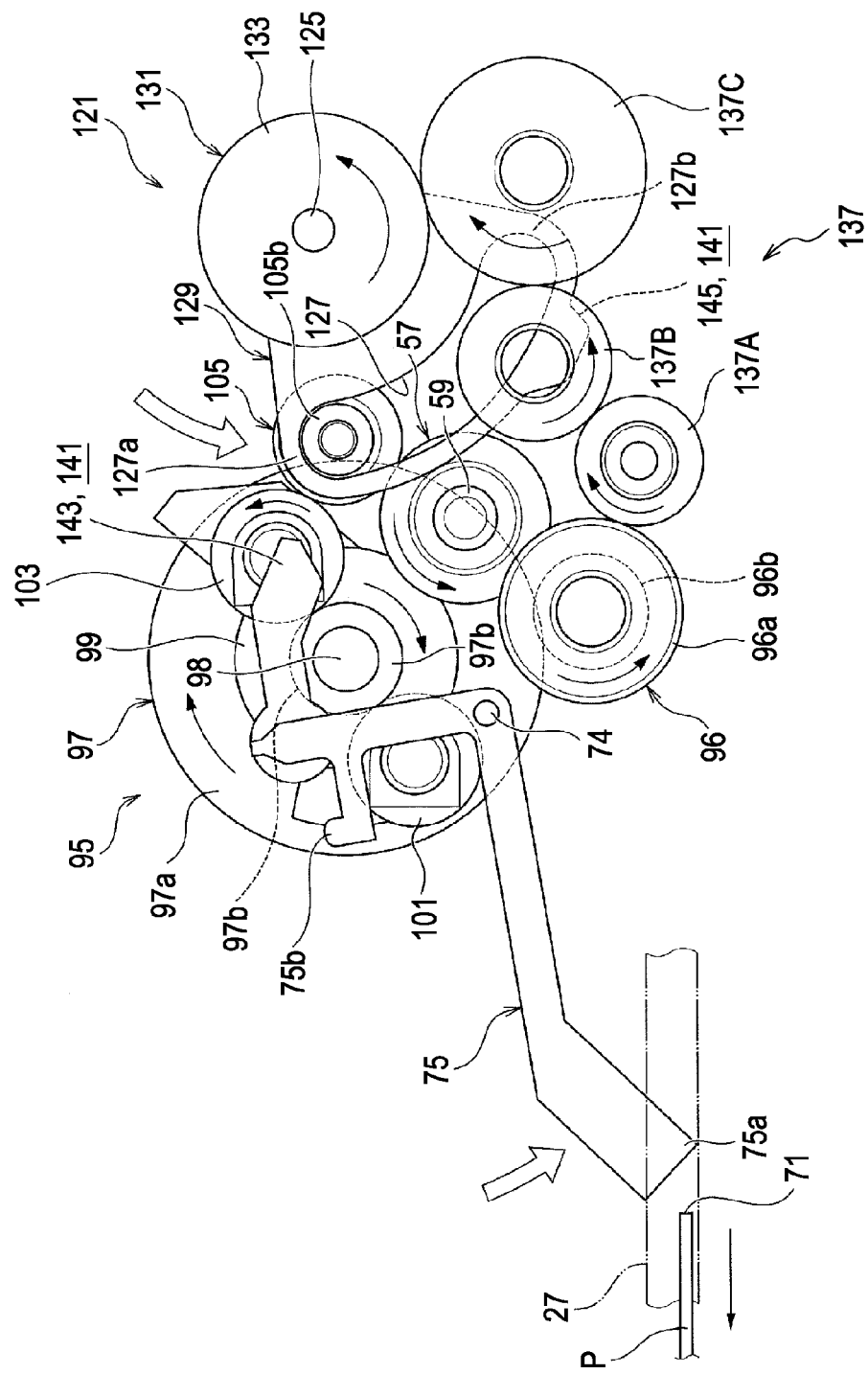
FIG. 15 is a side view of an operating state of the paper transporting device according to the first embodiment of the invention showing a state in which a power transmitting state of the cam lever, the detection lever, and the cam drive gear is being translated.

The detection lever 75 is formed of a bent and narrow panel-shaped member as shown in FIG. 8, FIG. 12 and FIG. 15. The distal end portion 75a of the detection lever 75 is a portion for detecting the presence or absence of the paper P or the timing of passage of the paper P, and is disposed so as to face the reversing path 27 as described above.

A hook portion 75b for hooking a spring is provided at a middle section of the detection lever 75, and an urging member 76 formed of a tension coil spring is provided in a strained manner between the hook portion 75b and a supporting frame 32 on the side surface of the paper transporting device 31A.

A restricting member 143 which is a component of the blocked-state locking mechanism 141, described below, is provided at an end portion of the detection lever 75 opposite from the distal end portion 75a as a working end thereof.

The detection lever 75 configured in this manner is mounted so as to be rotatable by a predetermined angle about a rotation support 74, and is disposed so that the distal end portion 75a projects in the direction closing the reversing path 27 by the urging force of the urging member 76.

The urging force of the urging member 76 is weak, so that the detection lever 75 is rotated by a slight force such as a force of passage of the paper P and the distal end portion 75a of the detection lever 75 can be retracted from the reversing path 27.

The blocked-state locking mechanism 141 is provided at the working end of the detection lever 75, and includes the restricting member 143 formed of a projecting portion having a wedge shape in side view and an engaging projection 145 having a trapezoidal shape in side view, being provided partly on a peripheral surface on the side of a free end of the rocking motion of the cam lever 129 and coming into abutment with the restricting member 143, for example.

The cam lever 129 rotates when the discharge drive roller 15 is rotated in the reverse direction CW and the paper P enters the reversing path 27 in a state in which the cam lever 129 locates the intermediate gear 105 at the first position 115. When the detection lever 75 detects the passage of the leading end of the paper P, the restricting member 143 comes into abutment with the engaging projection 145 to lock the power blocked state by restricting the rocking movement of the cam lever 129.

In contrast, when the detection lever 75 detects the passage of the trailing end of the paper P entered into the reversing path 27, the detection lever 75 rotates in the direction in which the distal end portion 75a closes the reversing path 27 by the urging force of the urging member 76, and hence the restricting member 143 moves away from the engaging projection 145, and locking of the power blocked state is released.

Figure 16:
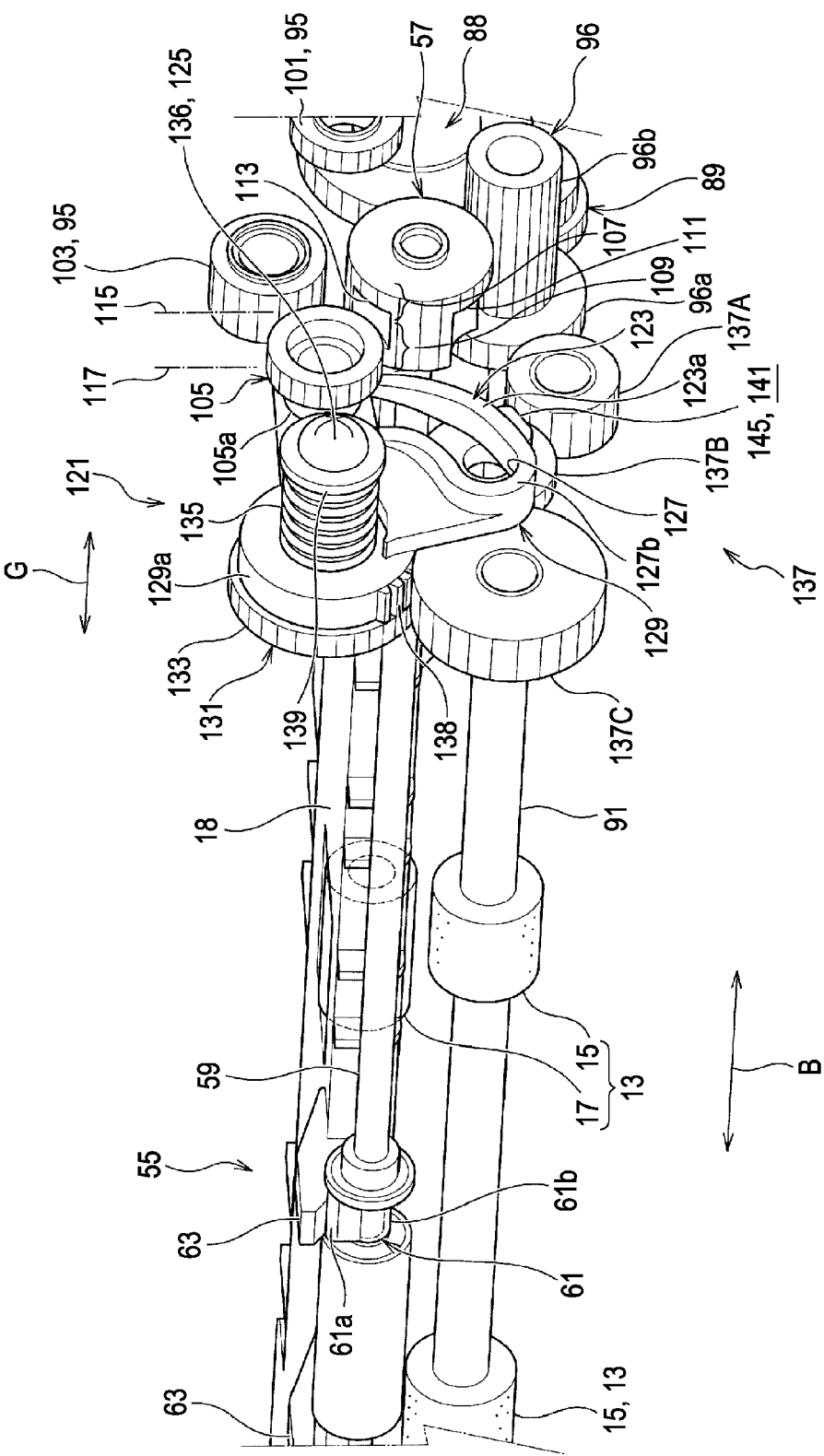
FIG. 16 is a perspective view of the nip-release switching mechanism and the gear train provided in the periphery of the cam drive gear of the paper transporting device according to the first embodiment of the invention showing a state in which the power blocked state is unlocked and the discharging rollers start translation from the released state to the nipped state.

Therefore, the cam lever 129 is allowed to rock in the predetermined direction by the rotation of the drive motor in the normal direction CCW, and the intermediate gear 105 is moved to the second position 117 to transmit the rotation in the direction to cause the discharging rollers 13 into the nipped state to the cam drive gear 57 (FIG. 16).

Subsequently, a working state of the paper transporting device 31A according to the first embodiment configured as described above will be described in parts (1) during the first surface transport, (2) during a first half of the second surface transport, and (3) during a latter half of the second surface transport.

(1) During the First Surface Transport (See FIG. 2, FIG. 3, FIG. 9, FIG. 10, and FIG. 17).

The paper P set on the feeding tray 39 with the first surface 3 faced up is picked up by the pick roller 47 and, on the way, is separated by the separating roller 49 and the separating pad 51 from the subsequent paper P, so that only the topmost paper P is delivered to the transport path 19.

The paper. P delivered to the transport path 19 is fed to the first transporting unit 21 with the first surface 3 faced up, is reversed upside down in the turning portion 23, and is fed to the transporting rollers 7 with the first surface 3 faced down.

Figure 10:
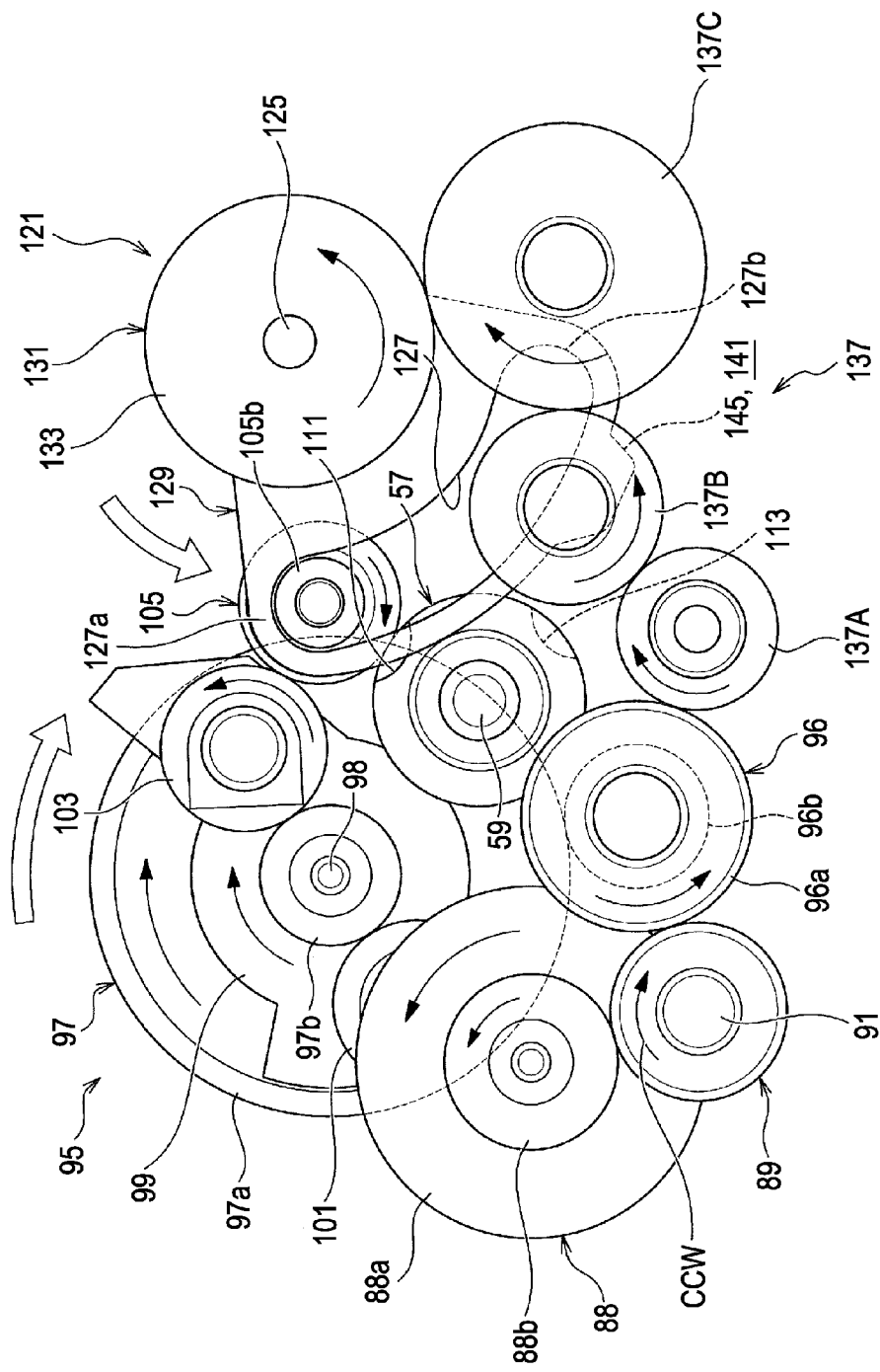
FIG. 10 is a side view of an operating state of the paper transporting device according to the first embodiment of the invention showing a state in which the cam drive gear and a drive motor of the gear train in the periphery of the cam drive gear rotate in a normal direction.

The drive motor rotates in the normal direction CCW during the first surface transport and, in FIG. 10, the rotation in the direction shown by an arrow is transmitted to the gear train, and the discharge roller drive gear 89 rotates in the normal direction CCW, which is a direction to discharge the paper P to the outside.

The solar gear 97 of the planetary gear mechanism 95 rotates clockwise in FIG. 10 to engage the second planetary gear 103 with the intermediate gear 105 to rotate the intermediate gear 105. At this time, since the tooth missing portion 111 for home position opposes the intermediate gear 105, the power is not transmitted to the cam drive gear 57, and the discharging rollers 13 maintains the nipped state shown in FIG. 17.

In addition, the rotation of the discharge roller drive gear 89 is transmitted to the cam lever drive gear train 137 via the second transmission gear 96, and the power transmitted to the cam lever drive gear train 137 is transmitted to the cam lever 129 via the friction clutch 131, and the cam lever 129 rocks counterclockwise in FIG. 10 to position the intermediate gear 105 to the second position 117.

The paper P fed to a nip point of the transporting rollers 7 is transferred toward the image processing executing unit 35 of the second transporting unit 25 with the first surface 3 faced down by the rotation of the transporting rollers 7 in the normal direction CCW transmitted via the roller driving gear train for transport, not shown.

In the image processing executing unit 35, an image recorded on the first surface 3 of the paper P is scanned by the image scanning portion 83 in sequence from the leading end to the trailing end of the paper P in accordance with the transport of the paper P, and is saved as image data.

When the paper P reaches the nip point of the discharging rollers 13, the paper P is discharged outside of the transport path 19 by the rotation of the discharging rollers 13 in the normal direction CCW and the discharge is stopped in a state shown in FIG. 3.

(2) During the First Half of the Second Surface Transport (See FIG. 3 to FIG. 5, FIG. 11 to FIG. 14, FIG. 17, and FIG. 18).

When the paper P reaches the state shown in FIG. 3, the rotation of the drive motor is switched to the reverse direction CW. Accordingly, the discharging rollers 13 rotate in the reverse direction CW while keeping the nipped state, and the paper P discharged to the outside of the transport path 19 is guided to the reversing path 27. Then, as shown in FIG. 4, the leading end 69 of the paper P comes into abutment with the distal end portion 75a of the detection lever 75 projecting to the reversing path 27. When the passage of the leading end 69 of the paper P is detected, the blocked-state locking mechanism 141 starts operation to achieve a state in which the counterclockwise movement of the cam lever 129 can be locked.

Figure 11:
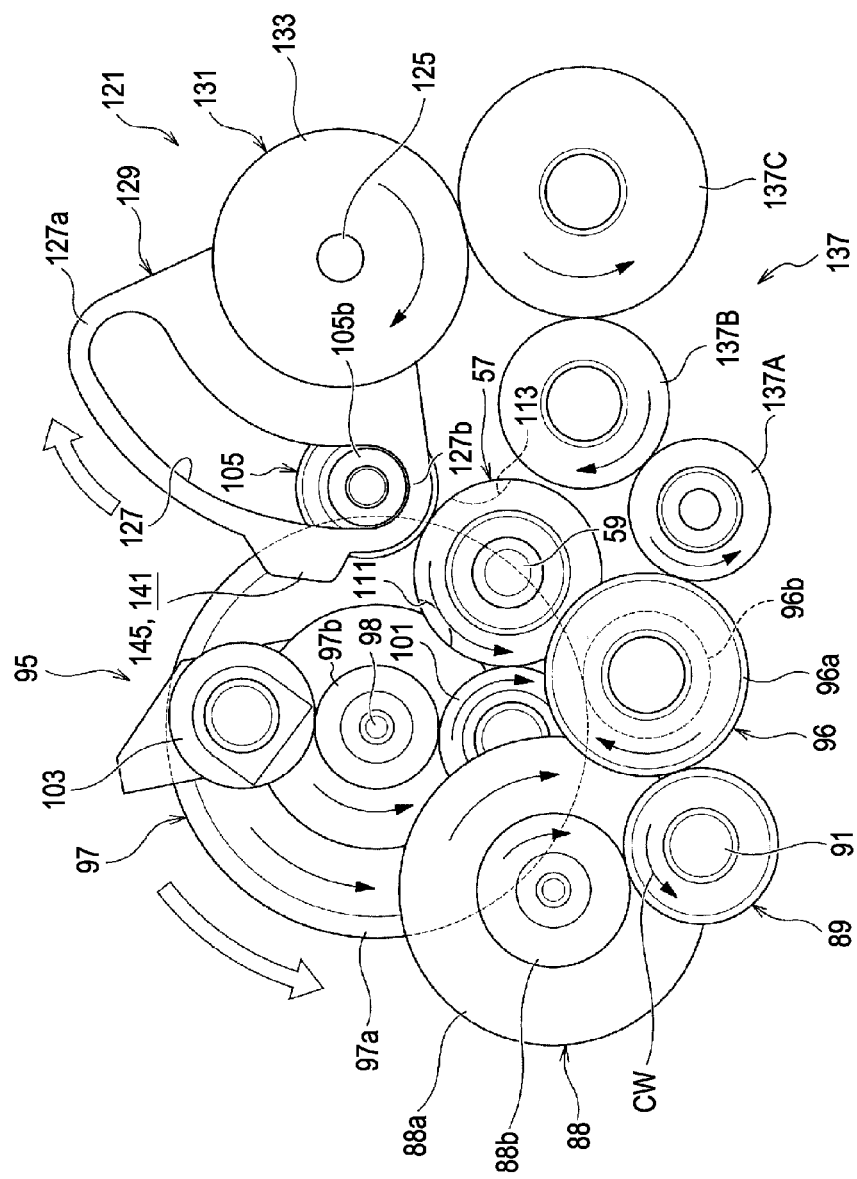
FIG. 11 is a side view of an operating state of the paper transporting device according to the first embodiment of the invention showing a state in which the cam drive gear and the drive motor of the gear train in the periphery of the cam drive gear rotate in a reverse direction.

The transmission of the power when the drive motor rotates in the reverse direction CW is as shown in FIG. 11, and the rotation in the direction indicated by an arrow in FIG. 11 is transmitted to the gear train. The rotation in the reverse direction CW which causes the paper P to enter the reversing path 27 is transmitted to the discharge roller drive gear 89 as described above.

The solar gear 97 of the planetary gear mechanism 95 rotates counterclockwise in FIG. 11 to engage the first planetary gear 101 directly with the entirely toothed portion 107 of the cam drive gear 57 to rotate the cam drive gear 57 counterclockwise in FIG. 11.

In addition, the rotation of the discharge roller drive gear 89 is transmitted to the cam lever drive gear train 137 via the second transmission gear 96. Then, the power transmitted to the cam lever drive gear train 137 is transmitted to the cam lever 129 via the friction clutch 131, and the cam lever 129 rocks clockwise in FIG. 11 to position the intermediate gear 105 to the first position 115.

Figure 5:
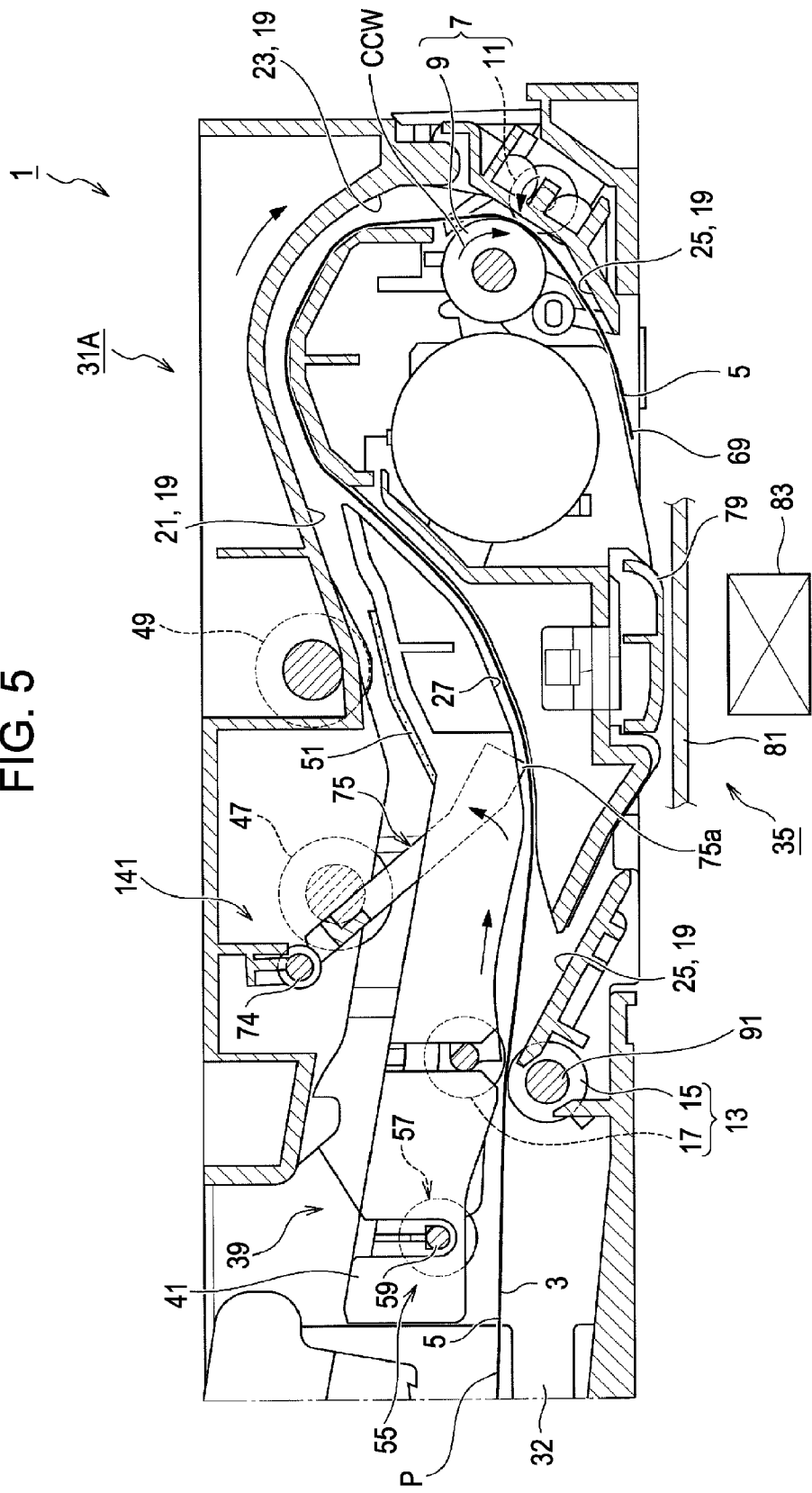
FIG. 5 is a side cross-sectional view showing an internal structure of the paper transporting device according to the first embodiment of the invention during a first half of the second surface transport.

The paper P entered into the reversing path 27 with the second surface 5 faced up is fed to a position upstream of the turning portion 23 of the transport path 19, reversed upside down by the turning portion 23, and is fed to the transporting rollers 7 with the second surface 5 faced down (FIG. 5).

Since the transporting rollers 7 are configured to rotate in the normal direction CCW in the normal state even when the direction of rotation of the drive motor is switched by the roller driving gear train for transport, not shown, the transporting rollers 7 pinch the fed paper P and transports the same toward the image processing executing unit 35 on the downstream thereof.

Figure 18:
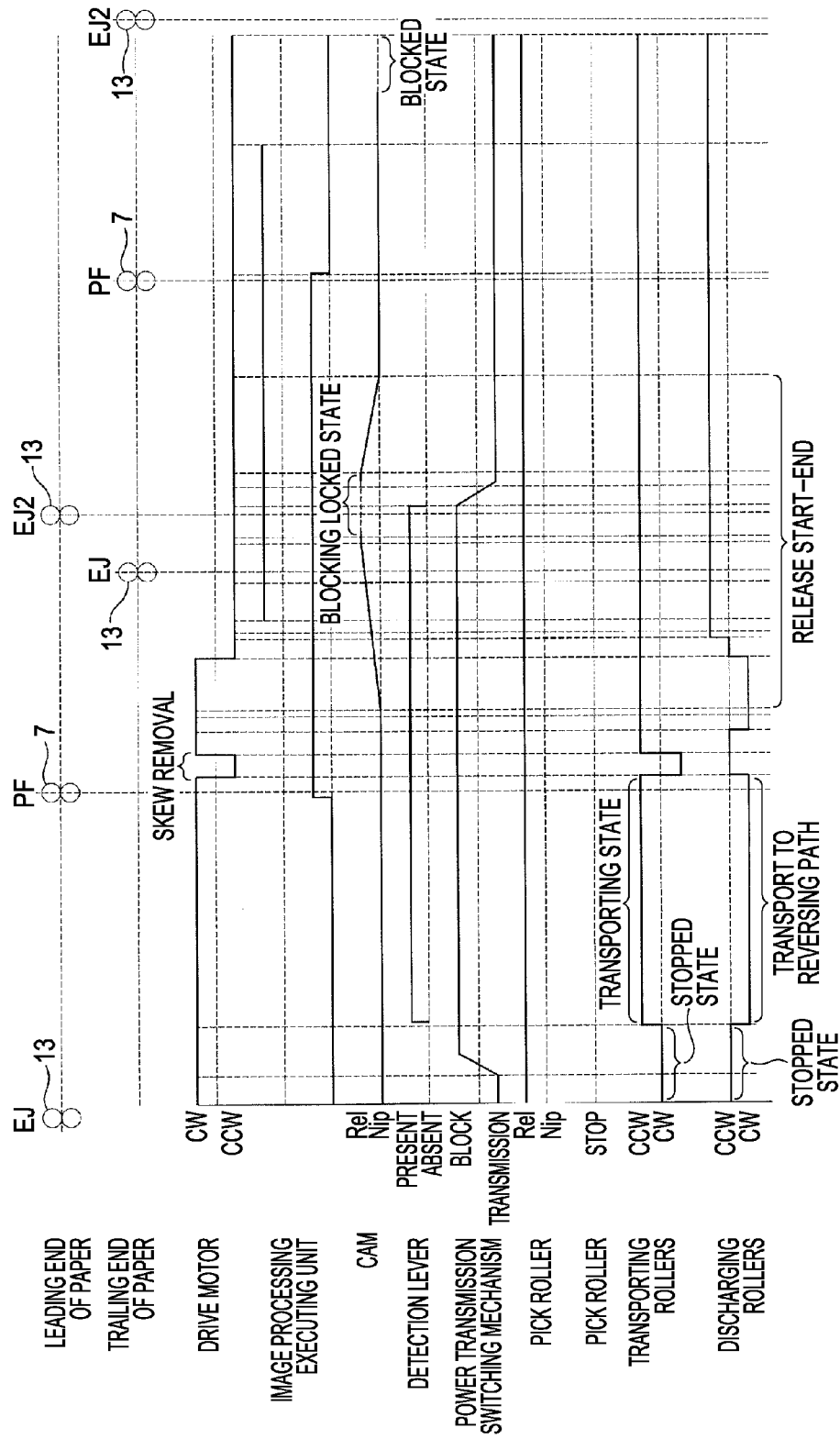
FIG. 18 is an operation chart of the second surface transport of the paper transporting device according to the first embodiment of the invention.

As shown in FIG. 18, the rotation of the drive motor is switched temporarily in the normal direction CCW at a position immediately after the leading end 69 of the paper P has passed through the transporting rollers 7. At this time, the roller driving gear train for transport, not shown, is configured so that the transporting rollers 7 rotate temporarily in the normal direction CCW. By the temporary switching of the direction of rotation of the transporting rollers 7, skew (inclination) occurring on the paper P being transported is removed, so that the paper P can be fed to the image processing executing unit 35 in the normal position.

After the removal of the skew as described above, the discharging rollers 13 start movement toward the released state as shown in FIG. 18 by the rotation of the cam drive gear 57 which receives the power from the first planetary gear 101.

When the leading end 69 of the paper P reaches at a position shown in FIG. 5 (the state in which the leading end 69 of the paper P is nipped by the transporting rollers 7) and the discharging rollers 13 are in the released state, the rotation of the drive motor is switched from the reverse direction CW to the normal direction CCW, and the power is transmitted from the second planetary gear 103 to the cam drive gear 57 via the intermediate gear 105.

When the cam drive gear 57 further rotates, the distal end portion 61a of the cam 61 is brought into the released state shown in FIG. 14, in which the distal end portion 61a moves the roller holder 18 to the uppermost position. When the discharge roller drive gear 89 is switched from the reverse direction CW to the normal direction CCW in the state shown in FIG. 11, a rotational force directed toward the position shown in FIG. 10 acts on the cam lever 129. However, since the cam lever 129 is in the locked state by the detection lever 75 (FIG. 12), the cam lever 129 is kept at the position shown in FIG. 12. Accordingly, the intermediate gear 105 is located at the first position 115 where the intermediate gear 105 opposes the tooth missing portion 113 for release position, when the cam drive gear 57 rotates and opposes the tooth missing portion 113 for release position, the transmission of the power to the cam drive gear 57 is blocked (the blocking-locked state in FIG. 18).

In other words, in this state, since the tooth missing portion 113 for release position of the cam drive gear 57 is moved to a position opposing the intermediate gear 105 locked at the first position 115, the power is not transmitted to the cam drive gear 57, and hence the released state of the discharging rollers 13 is continued.

(3) During the Latter Half of the Second Surface Transport, See FIG. 3 to FIG. 7, FIG. 9, FIG. 10, and FIG. 13 to FIG. 18.

Figure 6:
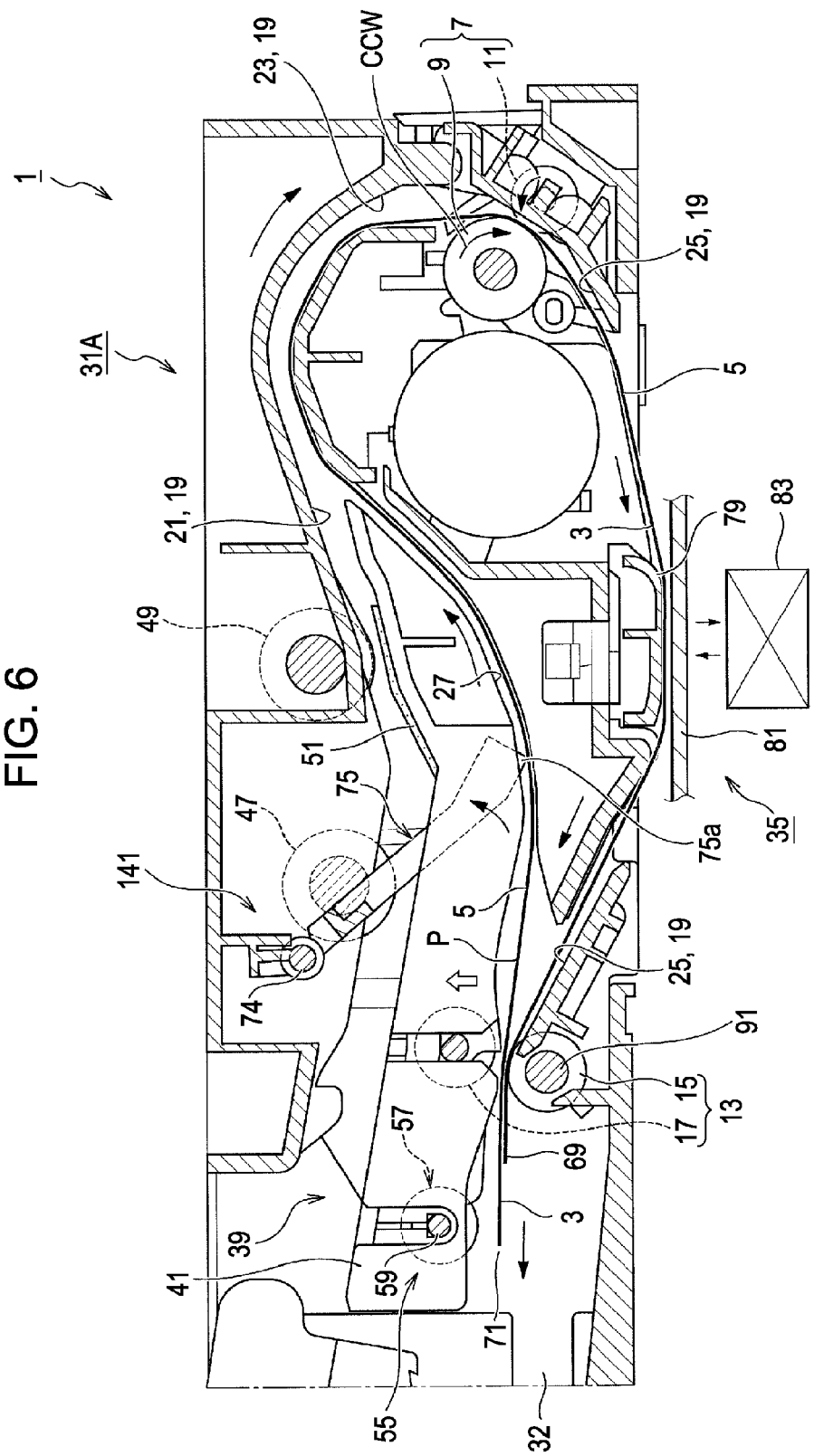
FIG. 6 is a side cross-sectional view showing an internal structure of the paper transporting device according to the first embodiment of the invention during an intermediate part of the second surface transport.

The released state of the discharging rollers 13 is continued corresponding to the length of the paper P and, in the case of the long paper P, the second surface transport of the paper P is performed in the state of allowing the both ends of the paper P to pass with each other at the nip of the discharging rollers 13 as shown in FIG. 6. The image recorded on the second surface 5 is scanned by the image scanning portion 83 in sequence, and the paper P having scanned the image thereon is discharged to the outside of the transport path 19 in sequence with the first surface 3 faced up.

In addition, as shown in FIG. 7, when the trailing end 71 of the paper P passes through the position of abutment with the distal end portion 75a of the detection lever 75, the detection lever 75 rotates counterclockwise in FIG. 15 by the urging force of the urging member 76 and unlocks the power blocked state with respect to the cam drive gear 57 by the engagement between the restricting member 143 and the engaging projection 145.

When the locked state of the blocked-state locking mechanism 141 is released, the cam lever 129 is allowed to rock counterclockwise in FIG. 15 by the rotation of the drive motor in the normal direction CCW, so that the power from the cam lever drive gear train 137 is transmitted to the cam lever 129 by utilizing the engagement of the sector gear portion 138 and the frictional force with respect to the friction clutch 131 as shown in FIG. 16.

The intermediate gear 105 moves to the second position 117 in the axial direction G by the rocking movement of the cam lever 129, moves out from the tooth missing portion 113 for release position, and engages the cam drive gear 57. Therefore, the rotation of the second planetary gear 103 is transmitted to the cam drive gear 57 via the intermediate gear 105.

The discharging rollers 13 are gradually translated toward the nipped state in association with the rotation of the cam drive gear 57. Then, the discharging rollers 13 are brought into the nipped state and apply a feeding force to the paper P. From then on, upon receipt of a transporting force from the transporting rollers 7 and the discharging rollers 13, the remaining second surface transport to the trailing end 71 of the paper P and scanning of the image recorded on the second surface 5 are performed, and then the paper P is discharged to the outside from the transport path 19 with the first surface 3 faced up.

The cam drive gear 57 is further rotated, and the rotation of the cam drive gear 57 is stopped at a position where the tooth missing portion 111 for home position opposes the intermediate gear 105.

When discharge of the paper P with the second surface 5 faced up is wanted, it is achieved by performing again the second surface transport described in (2) and (3) above in a state in which the image processing executing unit 35 is not activated. Second Embodiment, see FIG. 19 to FIG. 27

A paper transporting device 31B according to a second embodiment described later can be mounted in the scanner 1. In the paper transporting device 31B according to the second embodiment, the structures of the transport path 19, the reversing path 27, the image processing executing unit 35, the feeding tray 39, the transporting rollers 7, the discharging rollers 13, the roller driving gear train for transport, the discharge roller drive gear train 87, and the planetary gear mechanism 95 are the same as those of the paper transporting device 31A according to the first embodiment. As regards the nip-release switching mechanism 55, the configurations other than those of the cam drive gear 57 is the same as the paper transporting device 31A according to the first embodiment.

Therefore, in the following description, only configurations of a cam drive gear 57B, an intermediate gear 105B, a detection lever 75B, a power transmission switching mechanism 121B, and a blocked-state locking mechanism 141B, which are different from those in the paper transporting device 31A in the first embodiment are intensively described.

In this embodiment, a gear having a structure in which a first cam drive gear 151 formed with teeth over the entire circumference and a second cam drive gear 153 formed with the tooth missing portion 111 for home position partially on a peripheral surface thereof are integrally connected by a connecting shaft member 155 is used as the cam drive gear 57B.

Figure 28:
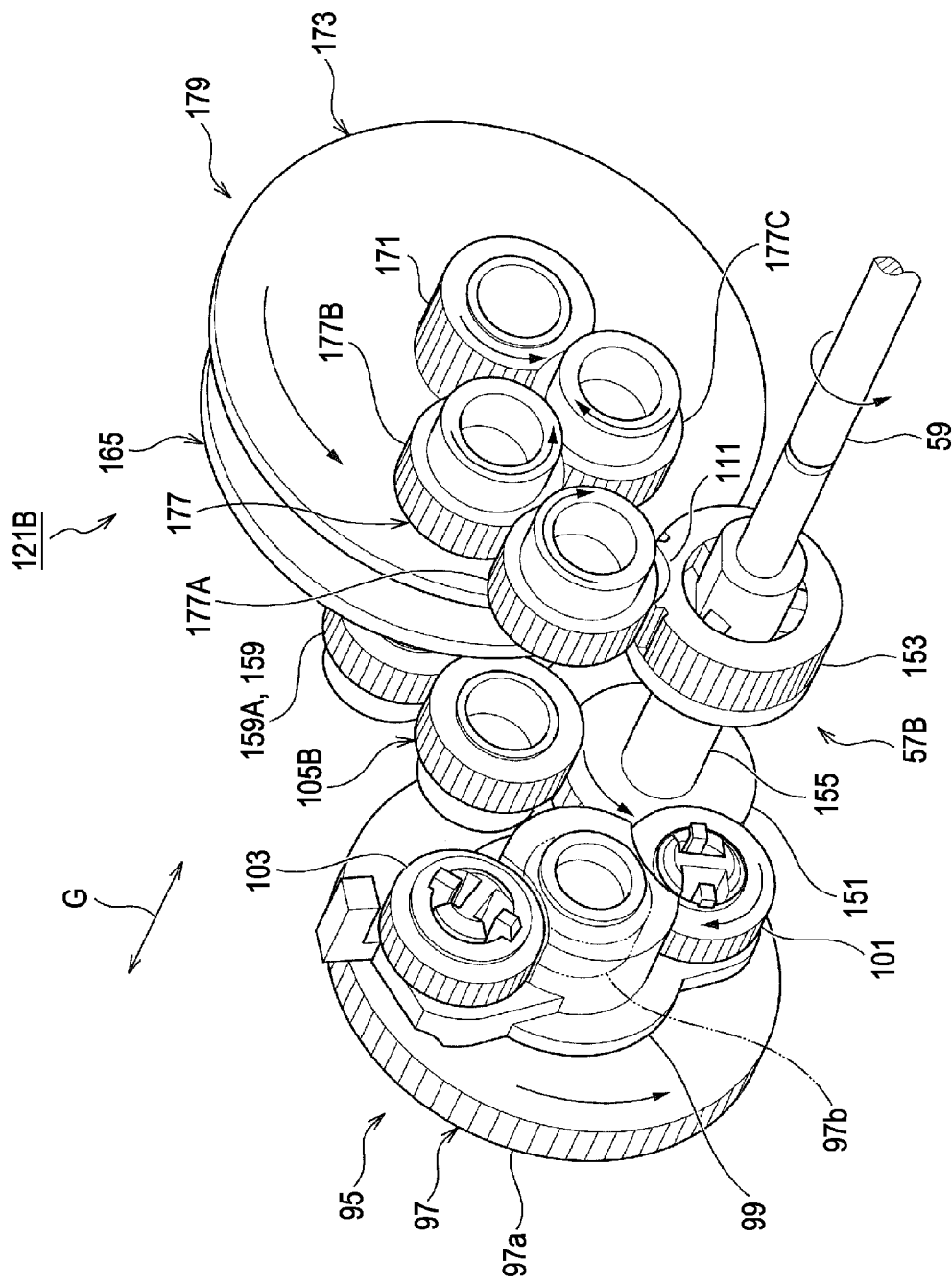
FIG. 28 is a perspective view of the paper transporting device according to the second embodiment of the invention showing an operating state in which the cam drive gear, the gear train in the periphery of the cam drive gear and the drive motor of the clutch mechanism are rotated in the reverse direction.

As shown in FIG. 28, the first planetary gear 101 engages the first cam drive gear 151 when the drive motor rotates in the reverse direction CW, so that the power is transmitted to the cam shaft 59 via the first cam drive gear 151.

Figure 29:
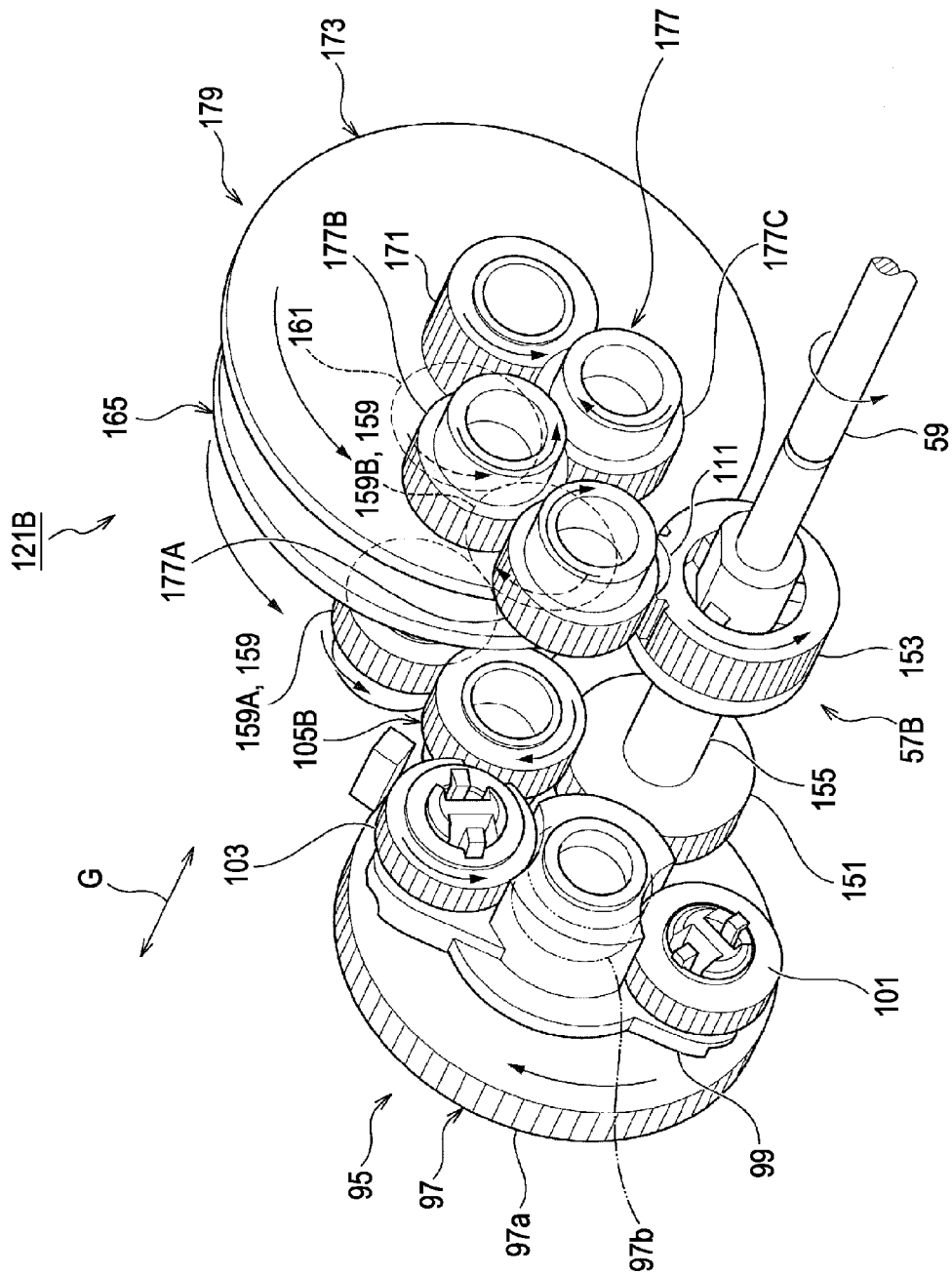
FIG. 29 is a perspective view of the paper transporting device according to the second embodiment of the invention showing an operating state in which the cam drive gear, the gear train in the periphery of the cam drive gear and the drive motor of the clutch mechanism are rotated in the normal direction.

As shown in FIG. 29, when the drive motor rotates in the normal direction CCW, the rotation is transmitted to the second cam drive gear 153 via the second planetary gear 103, the intermediate gear 105B, and the power transmission switching mechanism 121B, the cam drive gear 57B rotates in the same direction as in the case where the drive motor rotates in the reverse direction CW.

The intermediate gear 105B is different from the one in the first embodiment and has a fixed structure which is not allowed to move in the axial direction G, and is provided at a position which does not allow engagement with the first cam drive gear 151.

The power transmission switching mechanism 121B includes a primary-side gear train 159, a primary-side clutch disk 165, a secondary-side clutch disk 173, an urging member 175, and a secondary-side gear train 177. The primary-side gear train 159 includes two gears, namely, a first gear 159A and a second gear 159B which achieves transmission of the power by engaging the intermediate gear 105B. The primary-side clutch disk 165 integrally includes a transmission gear portion 161 and a claw gear 163 which engage the second gear 159B. The secondary-side clutch disk 173 integrally includes an engaging claw 167 engaging the claw gear 163 and projecting on the inner periphery side, a locking strip 169 projecting on the outer periphery side, which is a component of the blocked-state locking mechanism 141B, described later, and a transmission gear portion 171, the urging member 175 formed of a tension coil spring provided between the primary-side clutch disk 165 and the secondary-side clutch disk 173 in an expanded state and configured to urge the engaging claw 167 to always engage the claw gear 163. The secondary-side gear train 177 includes a third gear 177A which engages the second cam drive gear 153, a fourth gear 177B which engages the third gear 177A, and a fifth gear 177C which engages the fourth gear 177B and the transmission gear portion 171.

A clutch mechanism 179 includes the primary-side clutch disk 165, the secondary-side clutch disk 173, and the urging member 175 provided therebetween in the expanded state, and the clutch mechanism 179 is configured as so-called a one-way clutch (one-time clutch), which transmits the power from the primary-side clutch disk 165 to the secondary-side clutch disk 173, but does not transmit the power from the secondary-side clutch disk 173 to the primary-side clutch disk 165.

As shown in FIG. 19, FIG. 21, FIG. 23, and FIG. 25, the detection lever 75B is made up of a parallel link mechanism including a first rocking link 183 which makes a rocking movement about a rocking support 181 provided on the supporting frame 32, a second rocking link 187 which makes a rocking movement about a rocking support 185 provided on the supporting frame 32, and a rocking bar 193 connected to a free end of the rocking motion of the first rocking link 183 at a rotation support 189, connected to a free end of the rocking motion of the second rocking link 187 at a rotation support 191 and reciprocating toward the clutch mechanism 179.

The second rocking link 187 is integrally provided with a detection strip 195 extending toward the path of the paper P in the reversing path 27 so as to be slightly inclined in the direction along the direction of entry of the paper P.

The rocking bar 193 is a component of the blocked-state locking mechanism 141B, described below, and is configured to be capable of reciprocating between a hooking position 197 entered into a rotational trajectory of the locking strip 169 and a retracted position 199 retracted from the rotational trajectory.

An urging force of an urging device, not shown is applied to the rocking bar 193. In a state in which the paper P does not exist in the reversing path 27, the detection strip 195 extending from the second rocking link 187 projects into the reversing path 27, and closes the path of the paper P.

The blocked-state locking mechanism 141B basically includes the locking strip 169 provided for the clutch mechanism 179 and the rocking bar 193 provided for the detection lever 75B.

The locking strip 169 is integrally supported by an annular resilient supporting ring 201 having a predetermined width together with the engaging claw 167 which engages the claw gear 163. In contrast, the rocking bar 193 is supported by the first rocking link 183 and the second rocking link 187 described above so as to allow switching between the hooking position 197 at which the rocking bar 193 abuts against the locking strip 169 and the retracted position 199 at which it does not abut against the locking strip 169.

When the locking strip 169 is not in abutment with the rocking bar 193, the resilient supporting ring 201 maintains the power transmitting state in which the axial center thereof is aligned with the axial center of clutch mechanism 179 and the engaging claw 167 is engaged with the claw gear 163. In contrast, when the locking strip 169 is in abutment with the rocking bar 193, the resilient supporting ring 201 is resiliently deformed, and is moved to a position deviated from the axial center of the clutch mechanism 179 to release the engagement between the engaging claw 167 and the claw gear 163, so that a retained state in which the transmission of the power is blocked is assumed.

Subsequently, a working state of the paper transporting device 31B according to the second embodiment configured as described above during the second surface transport will be described in parts (1) when switching to the second surface transport, (2) when the leading end of the paper is detected, (3) when the power transmission blocking state is locked, and (4) when the transmission of the power is restarted.

(1) When Switching to the Second Surface Transport, See FIG. 17, FIG. 19, FIG. 20, and FIG. 28

Figure 17:
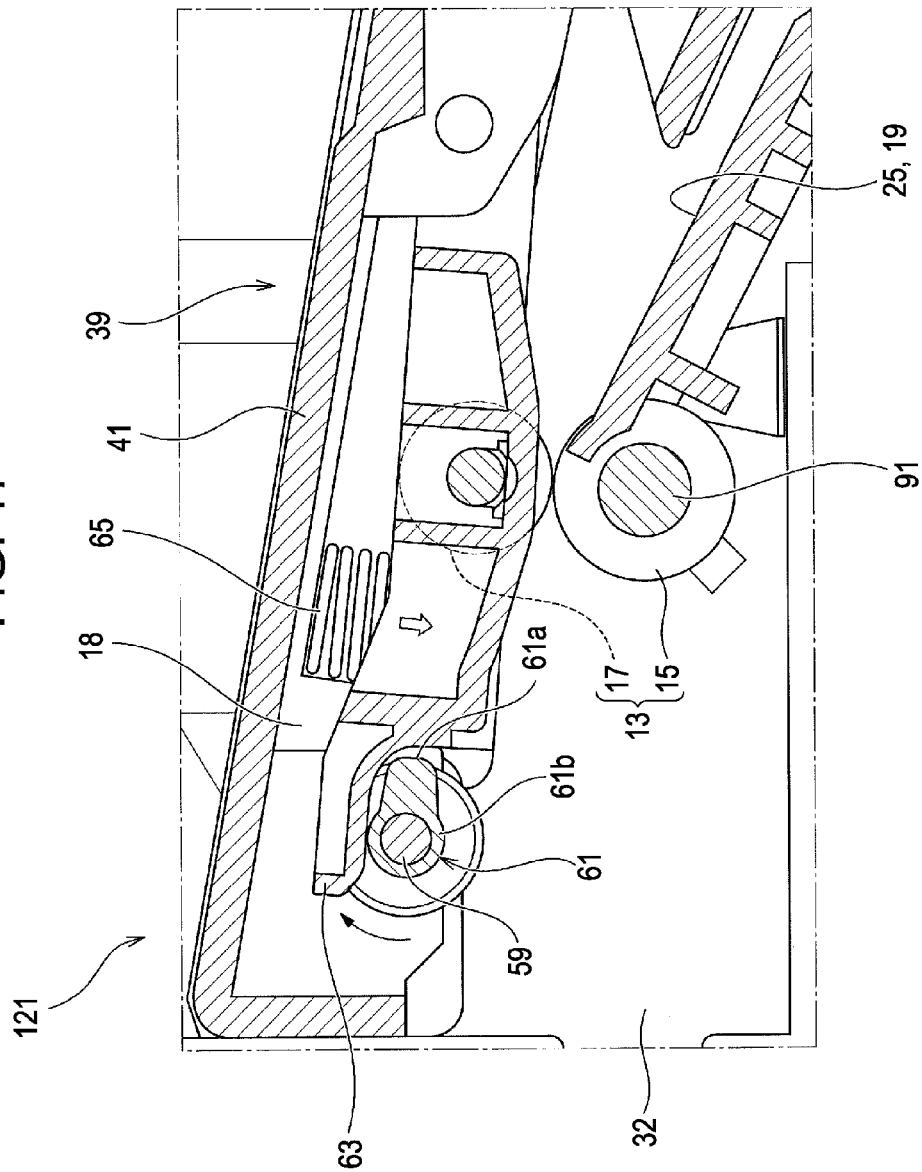
FIG. 17 is a side cross-sectional view of the nip-release switching mechanism and the periphery of the discharging rollers of the paper transporting device according to the first embodiment of the invention showing a state in which the discharging rollers are in the nipped state in an enlarged scale.
Figure 19:
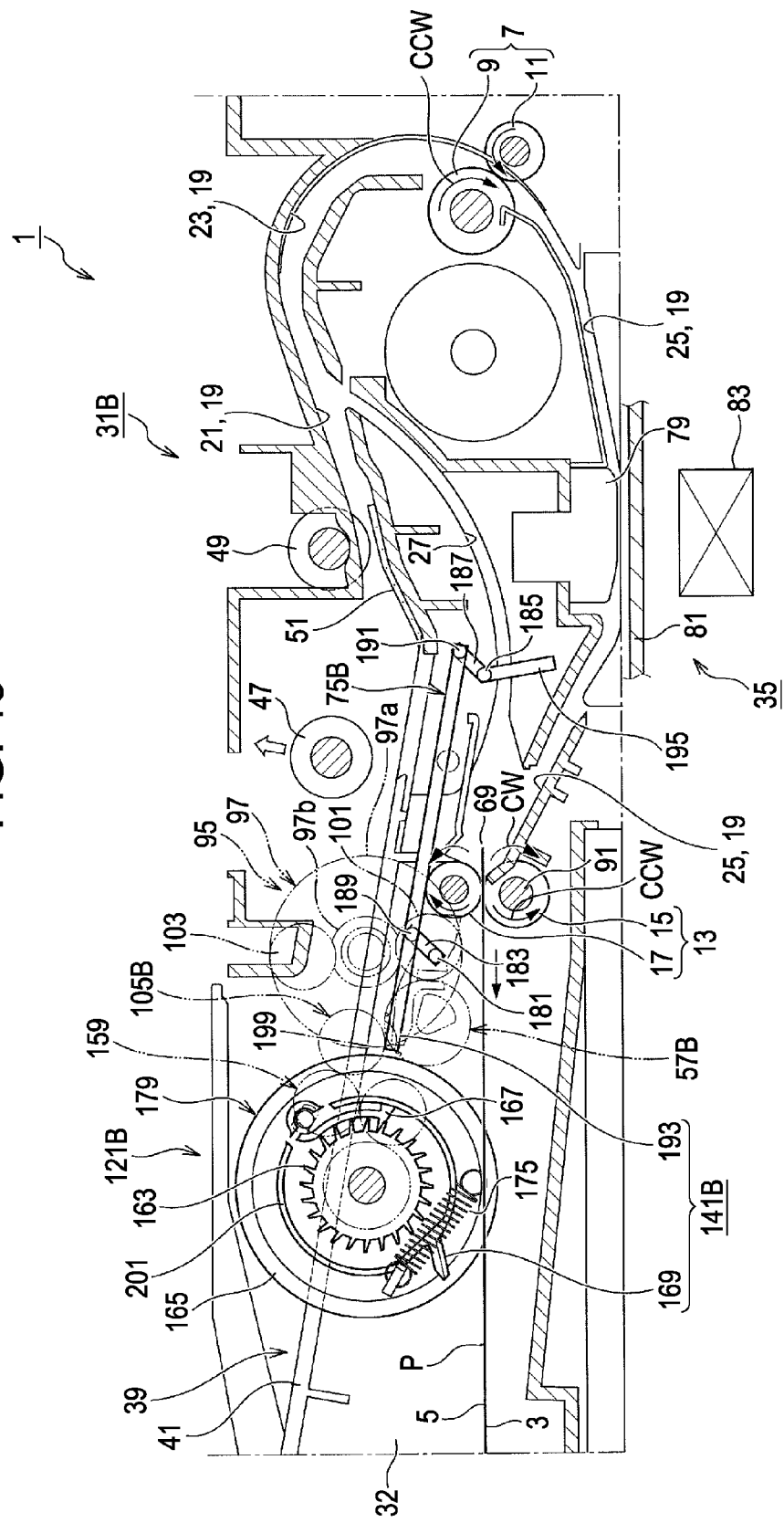
FIG. 19 is a side cross-sectional view showing an internal structure of the paper transporting device according to a second embodiment of the invention when the first surface transport is ended.

When the first surface transport performed by the rotation of the drive motor in the normal direction CCW is ended, the trailing end of the paper P (the leading end 69 of the paper P at the time of the second surface transport) in the direction of transport is brought into a state nipped by the discharging rollers 13 which is shown in FIG. 17 and FIG. 19.

Then, the direction of rotation of the drive motor is switched from the normal direction CCW to the reverse direction CW, and the second surface transport of the paper P is started.

Figure 20:
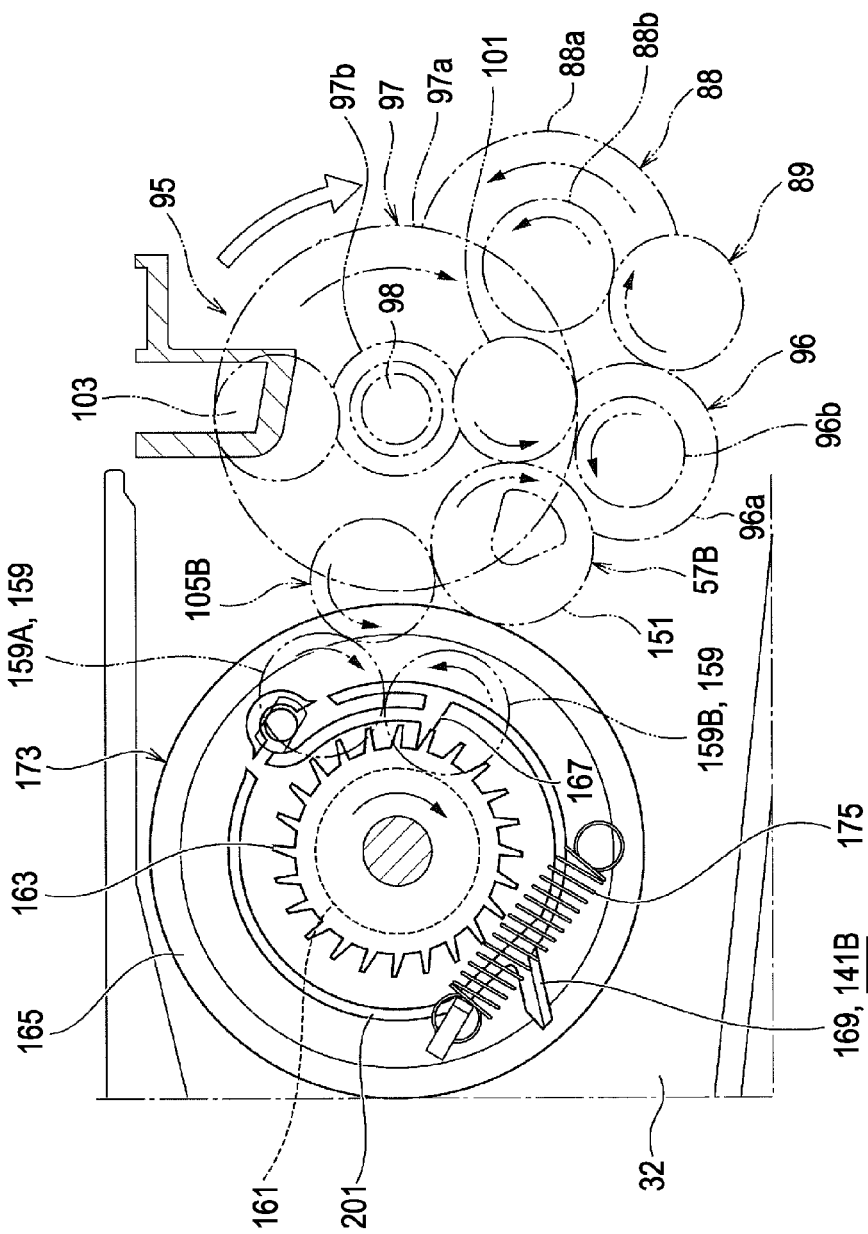
FIG. 20 is a side cross-sectional view of an operating state of a clutch mechanism of the paper transporting device according to the second embodiment of the invention when the first surface transport is ended.

The transmission of the power when the drive motor is switched to the reverse direction CW is as indicated by arrows in FIG. 20 and FIG. 28, and the first planetary gear 101 engages the first cam drive gear 151 of the cam drive gear 57B by the rotation of the solar gear 97 in the direction indicated by the arrows, so that the rotation of the first planetary gear 101 is directly transmitted to the cam drive gear 57B.

Since the third gear 177A of the secondary-side gear train 177 described above engages the second cam drive gear 153, the power is transmitted through the third gear 177A, the fourth gear 177B, and the fifth gear 177C, and the clockwise rotation in FIG. 20 is transmitted to the secondary-side clutch disk 173 via the transmission gear portion 171.

Since it is configured that the power is not transmitted from the secondary-side clutch disk 173 to the primary-side clutch disk 165, the primary-side clutch disk 165 stays stopped.

Figure 21:
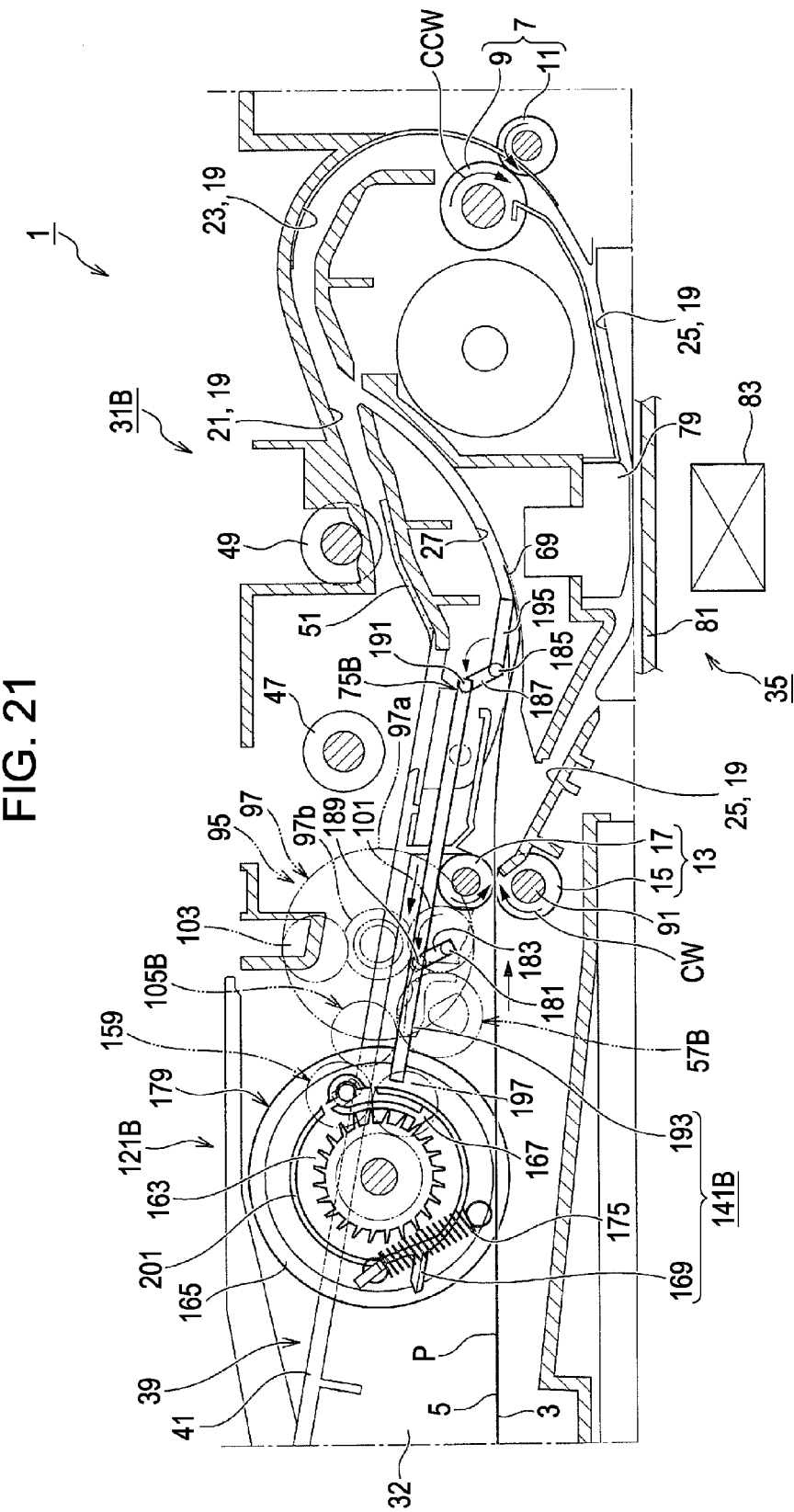
FIG. 21 is a side cross-sectional view of an internal structure of the paper transporting device according to the second embodiment of the invention showing a state immediately after having started the second surface transport and detected a leading end of the paper by the detection lever.
Figure 22:
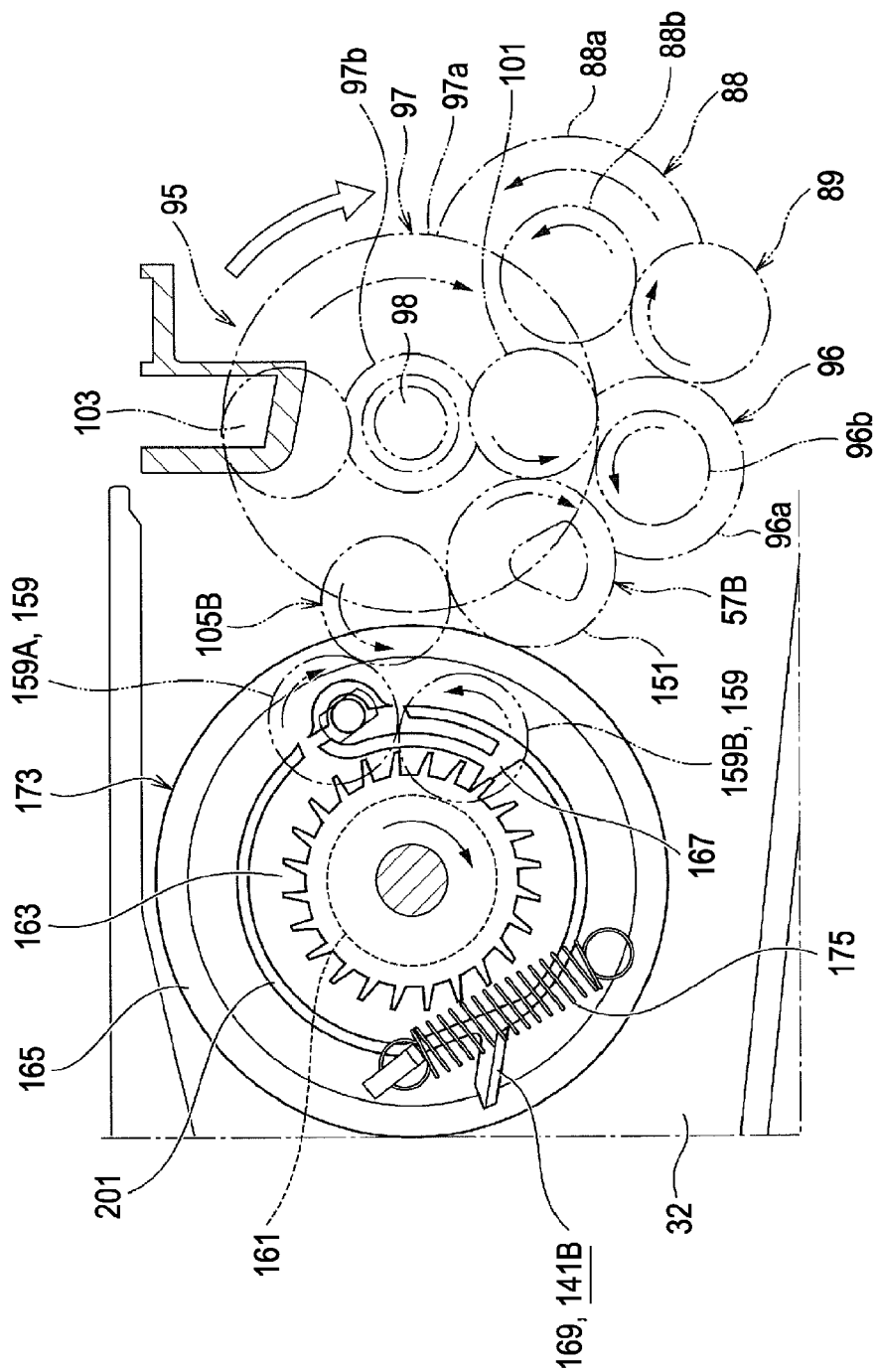
FIG. 22 is a side cross-sectional view of the paper transporting device according to the second embodiment of the invention showing an operating state of the clutch mechanism immediately after having started the second surface transport and detected the leading end of the paper by the detection lever.

(2) When the Leading End of the Paper is Detected (See FIG. 21, FIG. 22, and FIG. 28).

The paper P enters the reversing path 27 with the second surface 5 faced up by the rotation of the discharging rollers 13 in the reverse direction CW. When the leading end 69 of the paper P comes into abutment with the detection strip 195 of the detection lever 75B as shown in FIG. 21, the first rocking link 183 and the second rocking link 187 rock simultaneously as shown in the drawing to move the rocking bar 193 located at the retracted position 199 to the hooking position 197.

The power transmitting state at this time is the same as that when switching the second surface transport in (1) shown above.

(3) When Blocking of the Power Transmission is Locked, See FIG. 14, FIG. 23, FIG. 24, and FIG. 29

The paper P entered into the reversing path 27 is supplied to the upstream portion of the turning portion 23 in the transport path 19, is reversed upside down in the turning portion 23, and is supplied to the transporting rollers 7 rotating in the normal direction CCW with the second surface 5 faced down.

Then, in the same manner as the case in the embodiment 1, the skew-removing operation is performed for the paper P, and the paper P is fed toward the image processing executing unit 35.

At a timing when the leading end 69 of the paper P reaches a position near a midpoint between the transporting rollers 7 and the image processing executing unit 35, the direction of rotation of the drive motor is switched from the reverse direction CW to the normal direction CCW, and the rotation of the cam drive gear 57 is advanced to move the discharging rollers 13 gradually to the released state.

Figure 24:
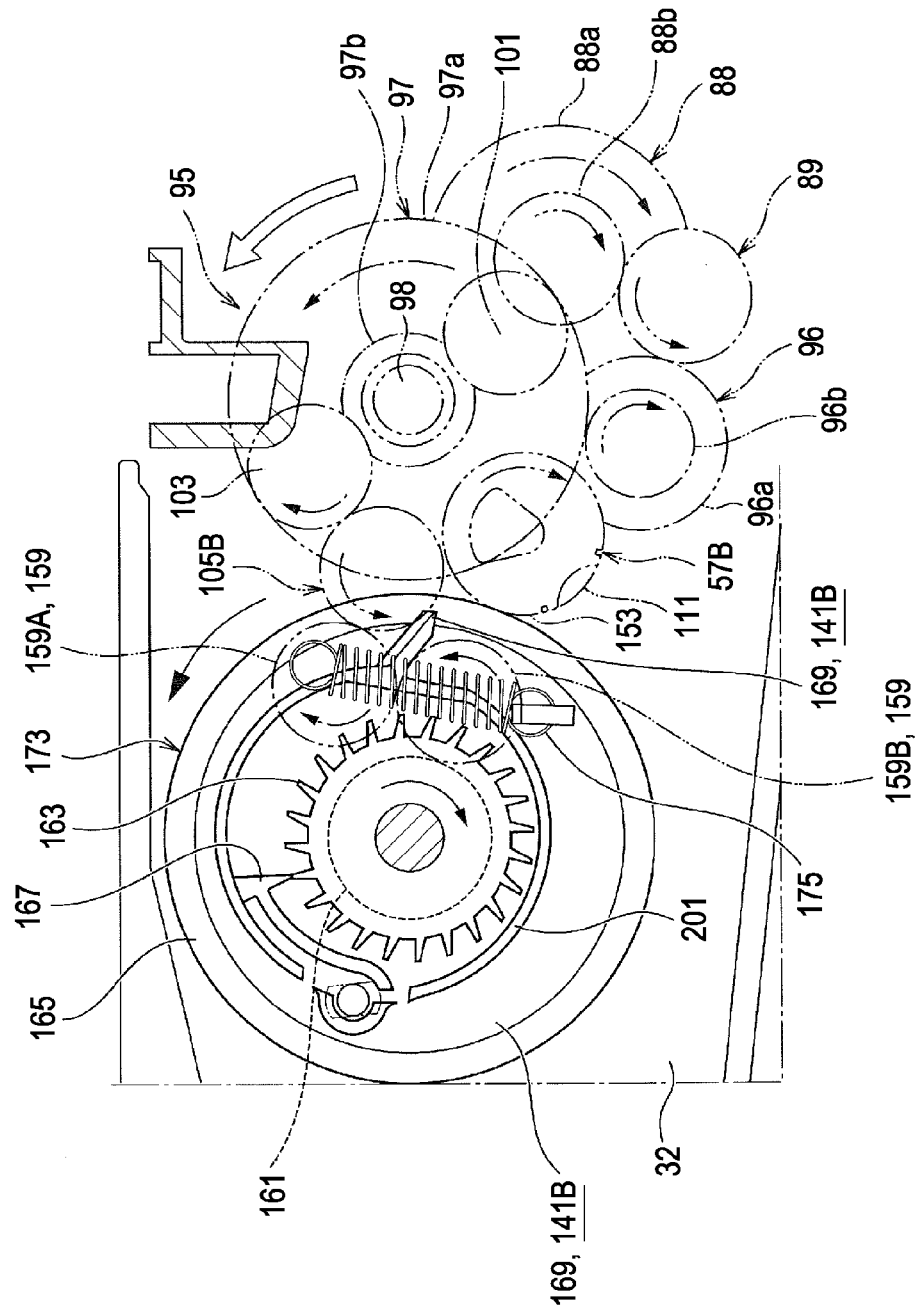
FIG. 24 is a side cross-sectional view of the paper transporting device according to the second embodiment of the invention showing an operating state of the clutch mechanism in which the second surface transport is proceeded and the leading end of the paper reaches a position upstream of the discharging rollers.

The transmission of the power when the drive motor is switched to the normal direction CCW is as indicated by arrows in FIG. 24 and FIG. 29, and the second planetary gear 103 engages the intermediate gear 105 by the rotation of the solar gear 97 in the direction indicated by an arrow. Then, the power is transmitted further from the first gear 159A to the second gear 159B, which constitutes the primary-side gear train 159, and the counterclockwise rotation in FIG. 24 is transmitted to the primary-side clutch disk 165 via the transmission gear portion 161.

The rotation of the primary-side clutch disk 165 is transmitted to the secondary-side clutch disk 173 via the claw gear 163 and the engaging claw 167 which are engaged with each other, and the power is transmitted further from the transmission gear portion 171 of the secondary-side clutch disk 173 to the fifth gear 177C, the fourth gear 177B, and the third gear 177A which constitute the secondary-side gear train 177 in sequence, so that the power is finally transmitted to the second cam drive gear 153 of the cam drive gear 57B.

The direction of rotation of the cam drive gear 57B in this case is the same direction as the case where the drive motor shown in FIG. 22 and FIG. 28 is rotated in the reverse direction CW.

Figure 23:
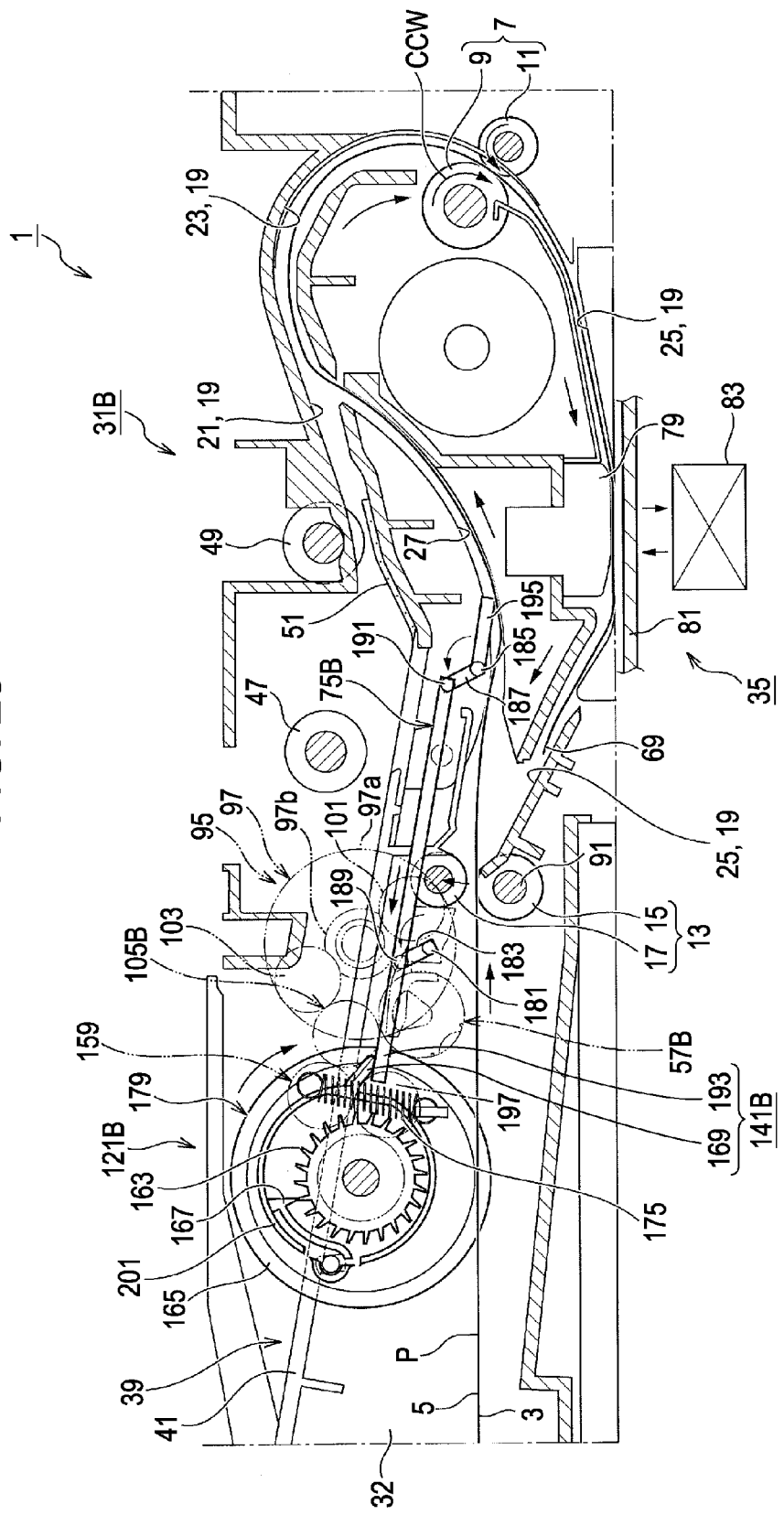
FIG. 23 is a side cross-sectional view of an internal structure of the paper transporting device according to the second embodiment of the invention showing a state in which the second surface transport is proceeded and the leading end of the paper reaches a position upstream of the discharging rollers.

When the leading end 69 of the paper P passes through the image processing executing unit 35, where the scanning of the image on the second surface 5 is started, and reaches a position before the discharging rollers 13 shown in FIG. 23, the discharging rollers 13 assume the released state shown in FIG. 14. Since the locking strip 169 of the blocked-state locking mechanism 141 comes into abutment with the rocking bar 193 located at the hooking position 197, the engagement between the claw gear 163 and the engaging claw 167 is released as shown in FIGS. 23 and 24, so that the transmission of the power to the cam drive gear 57B is blocked.

Therefore, the second surface transport of the paper P and the image scanning of the second surface 5 are performed with the discharging rollers 13 still in the released state.

Figure 25:
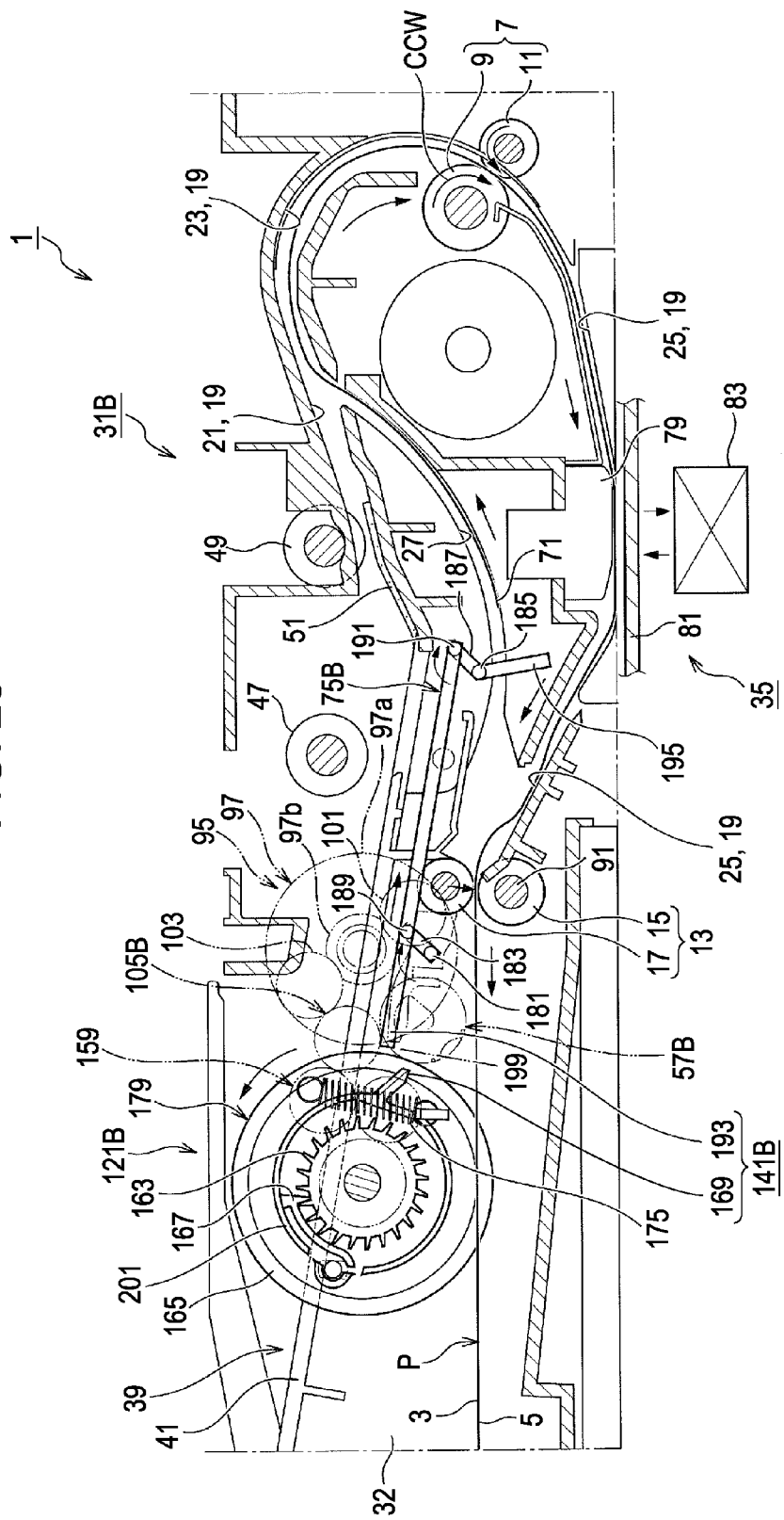
FIG. 25 is a side cross-sectional view of an internal structure of the paper transporting device according to the second embodiment of the invention showing a state immediately after having further proceeded the second surface transport and detected the passage of a trailing end of the paper by the detection lever.
Figure 26:
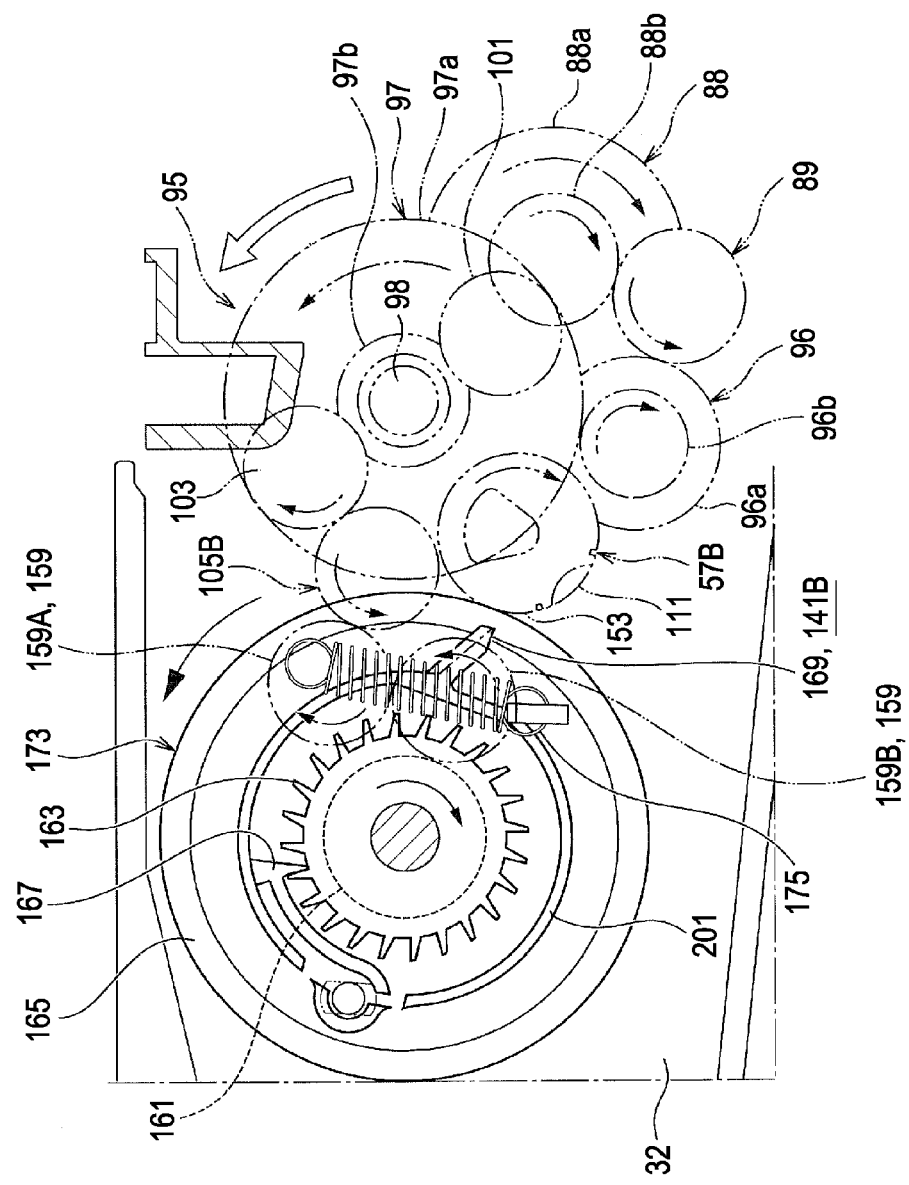
FIG. 26 is a side cross-sectional view of the paper transporting device according to the second embodiment of the invention showing an operating state of the clutch mechanism immediately after having further proceeded the second surface transport and detected the passage of the trailing end of the paper by the detection lever.
Figure 27:
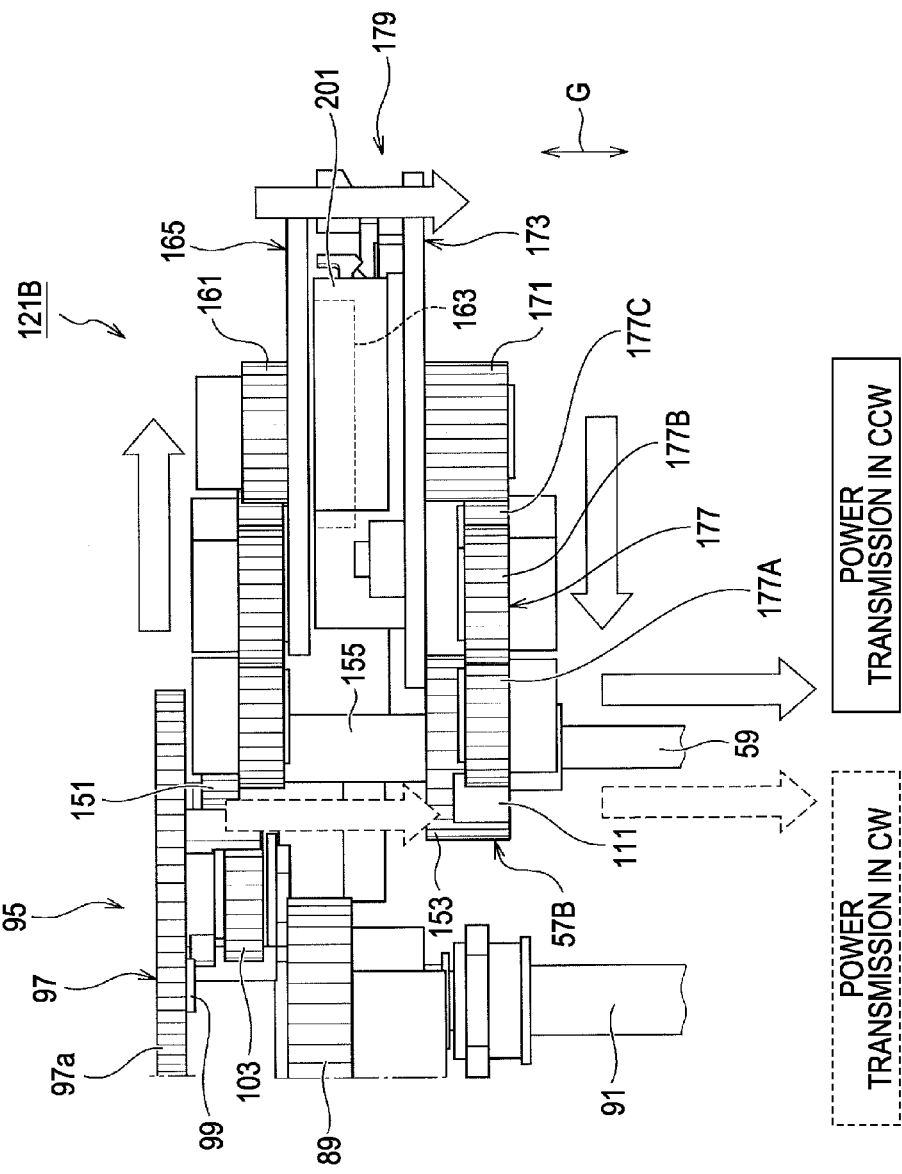
FIG. 27 is a top view of a cam drive gear, a gear train in the periphery of the cam drive gear, and the clutch mechanism of the paper transporting device according to the second embodiment of the invention.

(4) When the Transmission of the Power is Restarted, See FIGS. 25, 26 and 29

When the second surface transport of the paper P is advanced and the trailing end 71 of the paper P reaches a position shown in FIG. 25 passing through the detection strip 195 of the detection lever 75B, the rocking bar 193 is moved from the hooking position 197 to the retracted position 199 by the urging force of the urging device, not shown.

When the rocking bar 193 moves to the retracted position 199, the state of abutment between the locking strip 169 and the rocking bar 193 is released. Therefore, the engaging claw 167 engages the claw gear 163 again, and the rotation of the primary-side clutch disk 165 is transmitted to the secondary-side clutch disk 173.

Then, the rotation of the secondary-side clutch disk 173 is transmitted to the cam drive gear 57B via the secondary-side gear train 177, the discharging rollers 13 are translated to the nipped state by the rotation of the cam drive gear 57B, and the rotation of the cam drive gear 57B is brought into a stopped state at a position where the tooth missing portion 111 for home position opposes the third gear 177A.

In the state shown in FIG. 25, the paper P is transported upon receipt of the transporting force in the normal direction CCW from the two sets of rollers, namely, the transporting rollers 7 and the discharging rollers 13 and, after the trailing end 71 of the paper P has passed through the nip point of the transporting rollers 7, the discharge to the outside of the transport path 19 is performed only by the nipping and transporting force of the discharging rollers 13.

In this case, the paper P discharged from the discharging rollers 13 is discharged with the first surface 3 faced up. However, if the discharge of the paper P with the second surface 5 faced up, the second surface transport in (1) to (4) shown above is performed again in a state in which the image processing executing unit 35 is not activated as in the case of the first embodiment.

In the case of the paper transporting device 31B according to the second embodiment having a configuration as described above, a phase shift occurs between the clutch mechanism 179 and the cam drive gear 57B at the time point when the first surface transport is ended depending on the length of the paper P.

In this case, the phase shift with respect to the cam drive gear 57B can be prevented by performing the detection of the home position of the clutch mechanism 179 using a sensor or the like and correcting the phase shift after having ended the first surface transport of the paper P, or by providing a separate mechanism which blocks the rotation of the secondary-side gear train 177 or the secondary-side clutch disk 173 which are idled by the transmission of the rotation of the cam drive gear 57B when the drive motor rotates in the reverse direction CW, for example, a mechanism which causes some of gears which constitute the secondary-side gear train 177 to slide in the axial direction G to avoid the engagement, a one-way clutch mechanism or a planetary gear mechanism.

Alternatively, even when the phases of the clutch mechanism 179 and the cam drive gear 57B cannot be aligned after having ended the first surface transport, by setting the number of steps of the drive motor during the first surface transport and the reduction gear ratio of the respective gear trains with respect to a paper P having a specific length which causes the phase of the clutch mechanism 179 to be always the same, the continuous double-sided transport for the first surface 3 and the second surface 5, which is unaffected by the phase shift, can be achieved for the paper P having the above-described in question and a paper P having a length which is integral multiple of the above-described length.

A countermeasure for the phase shift between the clutch mechanism 179 and the cam drive gear 57B is specifically effective for making the timing of starting the image scanning by the image processing executing unit 35 constant.

Other Embodiments

The transported material transporting device 31 and the image processing apparatus 1 according to the invention basically have the configuration as described above. However, partial modifications or omissions of the configuration within a range not departing from the scope of the invention in the present application are possible as a matter of course.

For example, the paper transporting device 31 of the invention may be applied not only to the image scanning device such as a scanner which performs the image scanning continuously for the first surface 3 and the second surface 5 of the paper P, but may be applied to the image processing apparatus 1 which performs various image processing actions continuously on both the first surface 3 and the second surface 5 of the paper P such as image printing apparatuses such as an ink jet printer which performs printing continuously on both the first surface 3 and the second surface 5 of the paper P.

For example, when the paper transporting device 31 in the invention is applied to the ink jet printer, a mode of layout in which a printhead is disposed above the image processing executing unit 35, and a paper supporting portion is disposed below the image processing executing unit 35 may be employed, for example.

As another mode of the image processing executing unit 35, an image inspecting device configured to check the presence or absence or true-false of a content printed on the paper P or a colorimeter configured to obtain color information from a colorimetric pattern printed on the paper P may be employed. Alternatively, the image processing executing unit 35 may be omitted to singly use the paper transporting device 31.

Alternatively, instead of the power transmission switching mechanism 121 which is configured to move the intermediate gear 105 in the axial direction G using the cam lever 129 employed in the first embodiment, the power transmission switching mechanism 121 can be configured using other mechanisms such as a rack and pinion mechanism or a link mechanism.

In addition, the configuration of the blocked-state locking mechanism 141 is not limited to the one in the first embodiment in which the restricting member 143 provided directly for the detection lever 75 and the engaging projection 145 provided on the peripheral surface of the cam lever 129, but various configurations having the similar power transmission blocking state locking action such as a configuration in which a separate restricting member which moves in conjunction with the movement of the detection lever 75 or a configuration in which part of the restricting member is engaged with an engaging slit or an engaging hole formed on the cam lever 129 may be employed.

It is also possible to add a separate feeding roller or a guide roller to the transport path 19 or the reversing path 27 so as to support the transport of the paper P having smaller dimensions, and the material to be transported P as the object to be transported is not limited to the paper, but may be synthetic resin films such as the polyester film or the like. Images appearing on the first surface 3 and the second surface 5 of the material to be transported P may be characters or graphics printed directly by the image printing apparatus, images such as photographs, or figures or patterns appearing on a front surface by making with patterns such as Japanese Paper.

What is claimed is:

1. A transported material transporting device comprising:
    a transporting roller configured to transport a material to be transported on a transport path by rotating in a direction of normal rotation;
    a discharging roller configured to discharge the material to be transported on the transport path by rotating in the direction of normal rotation, deliver the material to be transported to the transporting roller via a reversing path by rotating in a direction of reverse rotation, and be capable of assuming a nipped state and a released state;
    a drive motor that serves as a driving source of the transporting roller and the discharging roller;
    a nip-release switching mechanism configured to switch the state of the discharging roller between the nipped state and the released state;
    a power transmission switching mechanism configured to switch the transmission of the power between the nip-release switching mechanism and the drive motor between a transmitted state and a blocked state;
    a detection unit provided in the reversing path and configured to detect the presence or absence of the material to be transported which enters the reversing path; and
    a blocked-state locking mechanism configured to lock the blocked state of the power transmission switching mechanism when the discharging roller is in the released state,
    wherein the locked state of the blocked-state locking mechanism is released and the power transmission switching mechanism is switched from the blocked state to the transmitted state upon detection of the position of the trailing end of the material to be transported entering the reversing path by the detection unit.

2. The transported material transporting device according to claim 1, wherein
    the detection unit includes a detection lever;
    the nip-release switching mechanism configured to switch the state of the discharging roller between the nipped state and the released state by the rotational position of a cam drive gear;
    a planetary gear mechanism including a first planetary gear configured to transmit a power to the cam drive gear when the drive motor rotates in one direction and a second planetary gear configured to transmit the rotation in the same direction as the first planetary gear to the cam drive gear via an intermediate gear when the drive motor rotates in the other direction; and
    the power transmission switching mechanism is configured to switch the transmission of the power between the intermediate gear and the cam drive gear between the transmitted state and the blocked state.

3. The transported material transporting device according to claim 2, wherein
    the cam drive gear includes on a peripheral surface thereof an entirely toothed portion formed with teeth over the entire circumference and a partially toothed portion provided partially with a tooth missing portion for a home position and a tooth missing portion for a release position, both of which are parts having no tooth provided partly on the peripheral surface,
    the first planetary gear engages the entirely toothed portion and the intermediate gear engages the partially toothed portion, and
    the intermediate gear is configured to be capable of being moved by the power transmission switching mechanism between a first position formed with both the tooth missing portion for the home position and the tooth missing portion for the release position and a second position formed only with the tooth missing portion for the home position in an axial direction.

4. The transported material transporting device according to claim 3, wherein
    the power transmission switching mechanism includes:
    a cam lever provided with a solid cam coming into abutment with an end surface of the intermediate gear and having a cam height in the axial direction, and configured to rock about a rocker shaft within a range of a rocking angle;
    a frictional clutch configured to come into press contact with the cam lever and transmit a power; and
    a cam lever drive gear train configured to transmit the rotation of the drive motor to the frictional clutch.

5. The transported material transporting device according to claim 4, wherein
    the cam lever includes a sector gear portion configured to transmit the power by engaging the intermediate gear when moving the intermediate gear from the first position to the second position.

6. The transported material transporting device according to claim 4, wherein the blocked-state locking mechanism includes a restricting member provided at a working end of the detection lever and an engaging projection provided on part of a peripheral surface of the cam lever and coming into abutment with the restricting member, the restricting member comes into abutment with the engaging projection to restrict the rocking movement of the cam lever after the material to be transported enters the reversing path and the detection lever detects the passage of a leading end of the material to be transported until the passage of a trailing end of the material to be transported is detected in a state in which the cam lever locates the intermediate gear at the first position.

7. An image processing apparatus comprising:

an image processing executing unit provided in a transport path at a position between a transporting roller and a discharging roller and configured to execute image processing actions continuously on an opposed surface of a material to be transported which is transported by the transporting roller; and a transported material transporting device configured to switch the direction of transport of the material to be transported to cause the material to be transported to enter a reversing path and reverse the same so that a first surface and a second surface opposite therefrom are opposed to the image processing executing unit after having executed the image processing on a first surface of the material to be transported, wherein the transported material transporting device is the transported material transporting device according to claim 1.

* * * * *